(12) United States Patent
Guo et al.

(10) Patent No.: US 12,677,256 B2
(45) Date of Patent: Jul. 7, 2026

(54) RESOURCE RESELECTION ASSISTANCE METHOD AND APPARATUS AND RESOURCE RESELECTION METHOD AND APPARATUS

(71) Applicant: Huawei Technologies Co., Ltd., Shenzhen (CN)

(72) Inventors: Wenting Guo, Shenzhen (CN); Hongjia Su, Shanghai (CN); Lei Dong, Shanghai (CN); Chang He, Shanghai (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 333 days.

(21) Appl. No.: 18/300,635

(22) Filed: Apr. 14, 2023

(65) Prior Publication Data

US 2023/0254820 A1 Aug. 10, 2023

Related U.S. Application Data

(63) Continuation of application No. PCT/CN2021/110846, filed on Aug. 5, 2021.

(30) Foreign Application Priority Data

Oct. 16, 2020 (WO) ................ PCT/CN2020/121690

(51) Int. Cl.
*H04W 72/02* (2009.01)
*H04L 5/00* (2006.01)
*H04W 72/20* (2023.01)

(52) U.S. Cl.
CPC ........... *H04W 72/02* (2013.01); *H04L 5/0053* (2013.01); *H04W 72/20* (2023.01)

(58) Field of Classification Search
CPC ...... H04L 5/0053; H04W 72/02; H04W 72/20
See application file for complete search history.

(56) References Cited

U.S. PATENT DOCUMENTS

| | | | |
|---|---|---|---|
| 2019/0174545 A1 | 6/2019 | Li et al. | |
| 2019/0349836 A1 | 11/2019 | Lee et al. | |
| 2022/0030598 A1* | 1/2022 | Li | H04W 72/0446 |

FOREIGN PATENT DOCUMENTS

| | | |
|---|---|---|
| CN | 106792885 A | 5/2017 |
| CN | 109691146 A | 4/2019 |

(Continued)

OTHER PUBLICATIONS

CATT, [Draft] "LS to RAN1 on New Resource (Re-) Selection Triggers", 3GPP TSG RAN WG2#109-e, R2-2000208, Electronic meeting, Feb. 24-Mar. 6, 2020, 1 page.

(Continued)

*Primary Examiner* — Brian P Cox
(74) *Attorney, Agent, or Firm* — Slater Matsil, LLP

(57) ABSTRACT

A third terminal receives control information from a first terminal, where the control information indicates a first resource and a second resource, the first resource carries first data corresponding to the control information, and the second resource is a sending resource reserved by the first terminal; the third terminal determines that the second resource meets a reselection condition; and the third terminal sends indication information to the first terminal, where the indication information indicates to reselect the second resource. When determining that a resource conflict exists in the second resource, the third terminal can indicate the first terminal in time to reselect the second resource, to prevent the first terminal from continuing to use the second resource to send data.

18 Claims, 12 Drawing Sheets

Transmitting end UE has data to be sent to receiving end UE

(56) References Cited

FOREIGN PATENT DOCUMENTS

| CN | 110167072 A | 8/2019 |
| CN | 111464953 A | 7/2020 |
| CN | 112640499 A | 4/2021 |

OTHER PUBLICATIONS

3GPP TS 23.287 V16.4.0 (Sep. 2020), 3rd Generation Partnership Project;Technical Specification Group Services and System Aspects;Architecture enhancements for 5G System (5GS) to supportVehicle-to-Everything (V2X) services (Release 16), 58 pages.

Huawei et al., "Remaining details of sidelink resource allocation mode 2", 3GPP TSG RAN WG1 Meeting #101-e, R1-2003495, E-meeting, May 25-Jun. 5, 2020, 24 pages.

3GPP TS 38.212 V16.3.0 (Sep. 2020), 3rd Generation Partnership Project;Technical Specification Group Radio Access Network; NR; Multiplexing and channel coding (Release 16), 152 pages.

CAICT, "Considerations on the Resource Allocation for NR Sidelink Mode2", 3GPP TSG RAN WG1 #98bis R1-1911323, Chongqing, China, Oct. 14-20, 2019, 5 pages.

3GPP TS 38.213 V16.3.0 (Sep. 2020), 3rd Generation Partnership Project; Technical Specification Group Radio Access Network; NR; Physical layer procedures for control (Release 16), 179 pages.

Huawei et al., "Details of Sensing Procedure and Resource (Re)Selection Triggering Mechanisms", 3GPP TSG RAN WG1 Meeting #86, R1-166169, Gothenburg, Sweden, Aug. 22-26, 2016, 6 pages.

3GPP TS 38.214 V16.3.0 (Sep. 2020), 3rd Generation Partnership Project;Technical Specification Group Radio Access Network; NR; Physical layer procedures for data (Release 16), 166 pages.

CMCC, "Discussion on Sidelink Resource Allocation Mechanism", 3GPP TSG RAN WG1 #96bis R1-1904729, Xi'an, China, Apr. 8-12, 2019, 3 pages.

3GPP TS 38.321 V16.2.1 (Sep. 2020), 3rd Generation Partnership Project; Technical Specification Group Radio Access Network; NR; Medium Access Control (MAC) protocol specification (Release 16), 154 pages.

3GPP TS 38.331 V16.2.0 (Sep. 2020), 3rd Generation Partnership Project; Technical Specification Group Radio Access Network; NR; Radio Resource Control (RRC) protocol specification (Release 16), 926 pages.

VIVO, Discussion on mode 2 enhancements. 3GPP TSG RAN WG1 #102-e, e-Meeting, Aug. 17-28, 2020, R1-2005404, 5 pages.

LG Electronics, Discussion on feasibility and benefits for mode 2 enhancement. 3GPP TSG RAN WG1 Meeting #102- e, e-Meeting, Aug. 17-28, 2020, R1-2005749, 9 pages.

Qualcomm Incorporated, Reliability and Latency Enhancements for Mode 2. 3GPP TSG RAN WG1 Meeting #102-e, Aug. 17-28, 2020, R1-2006829, 9 pages.

Robert Bosch GmbH, Sidelink Resource Allocation Enhancements. 3GPP TSG RAN WG1 #102-e, E-Meeting, Aug. 17-28, 2020, R1-2006876, 5 pages.

* cited by examiner

Network
device

Sidelink

UE 1                                        UE 2

Base station

Downlink
control
information

Transmitting
end UE

Control information
and data

Receiving
end UE

Resource 1

Resource 1
Exclude

Resource 2

Resource 2
Exclude

Resource 3

Resource 3
Exclude

Resource listening
window

Resource selection
window

Slot n–T         Slot n   Slot n+T1        Slot n+T2

Transmitting end UE has data to
be sent to receiving end UE

|  | 0 | 1 | 2 | ... | 11 | 12 | 13 |  | Bitmap | PSFCH |
|---|---|---|---|---|---|---|---|---|---|---|
| PRB 0 |  |  |  |  |  |  |  | 1 | | |
| 1 |  |  |  |  |  |  |  | 1 | | |
| 2 |  |  |  |  |  |  |  | 1 | | |
| 3 |  |  |  |  |  |  |  | 1 | | |
| 4 |  |  |  |  |  |  |  | 0 | | |
| 5 |  |  |  |  |  |  |  | 0 | | |
| 6 |  |  |  |  |  |  |  | 0 | | |
| 7 |  |  |  |  |  |  |  | 0 | | |
| 8 |  |  |  |  |  |  |  | 0 | | |
| 9 |  |  |  |  |  |  |  | 0 | | |
| 10 |  |  |  |  |  |  |  | 1 | | |
| 11 |  |  |  |  |  |  |  | 1 | | |
| 12 |  |  |  |  |  |  |  | 1 | | |
| 13 |  |  |  |  |  |  |  | 1 | | |
| 14 |  |  |  |  |  |  |  | 0 | | |
| 15 |  |  |  |  |  |  |  | 0 | | |
| 16 |  |  |  |  |  |  |  | 0 | | |
| 17 |  |  |  |  |  |  |  | 0 | | |
| 18 |  |  |  |  |  |  |  | 0 | | |
| 19 |  |  |  |  |  |  |  | 0 | | |
| 20 |  |  |  |  |  |  |  | 1 | | |
| 21 |  |  |  |  |  |  |  | 1 | | |
| 22 |  |  |  |  |  |  |  | 1 | | |
| 23 |  |  |  |  |  |  |  | 1 | | |
| 24 |  |  |  |  |  |  |  | 0 | | |
| 25 |  |  |  |  |  |  |  | 0 | | |
| 26 |  |  |  |  |  |  |  | 0 | | |
| 27 |  |  |  |  |  |  |  | 0 | | |
| 28 |  |  |  |  |  |  |  | 0 | | |
| 29 |  |  |  |  |  |  |  | 0 | | |

Second feedback resource set

Resource pool

One SL transmission slot

PSSCH bonding window length

RESOURCE RESELECTION ASSISTANCE METHOD AND APPARATUS AND RESOURCE RESELECTION METHOD AND APPARATUS

CROSS-REFERENCE TO RELATED APPLICATIONS

This application is a continuation of International Application No. PCT/CN2021/110846, filed on Aug. 5, 2021, which claims priority to Chinese Patent Application No. PCT/CN2020/121690, filed on Oct. 16, 2020, the disclosures of the aforementioned applications are hereby incorporated by reference in their entireties.

TECHNICAL FIELD

This application relates to the field of communications technologies, and in particular, to a resource reselection assistance method and apparatus and a resource reselection method and apparatus.

BACKGROUND

With development of communications technologies, starting from the 3rd generation partnership project (3GPP) Release 12, both a 4th generation (4G) communications system (that is, a long term evolution (LTE) communications system) and a 5th generation (5G) communications system can support device-to-device (D2D) communication. This communication mode is referred to as sidelink communication, and a connection established between two devices is a sidelink. A device that supports sidelink communication is briefly referred to as a sidelink device below.

Because two sidelink devices may directly send data to each other without passing through a base station, a core network, or the like, a data transmission delay can be greatly reduced. An application scenario of sidelink communication is vehicle-to-everything (V2X). V2X is mainly used to implement communication between vehicles (V2V), between a vehicle and an infrastructure, between a vehicle and a pedestrian, between a vehicle and a network, and the like.

Sidelink communication supports a hybrid automatic repeat request (HARQ). To be specific, after a transmitting end transmits sidelink data on a PSSCH, a receiving end may feed back, through a PSFCH based on a decoding result of a signal received on the PSSCH channel, a response message (for example, an ACK/a NACK) corresponding to the sidelink data.

The transmitting end needs to send resource reservation information to the receiving end before transmitting the sidelink data on the PSSCH. The transmitting end listens, in a resource listening window, to sidelink control information (SCI) sent by another transmitting end in a frequency domain resource pool, deletes, from a candidate resource pool, a resource that has been reserved by the another transmitting end and whose reference signal received power is greater than a preset threshold, and then selects an available resource for resource reservation. However, when two transmitting ends are far away from each other and cannot listen to SCI sent by each other, resources reserved by the two transmitting ends for the receiving end may overlap, causing a resource conflict. When sending resources for sending sidelink data by the two transmitting ends conflict, the receiving end feeds back, through only the PSFCH, a response message corresponding to the sidelink data, and the transmitting ends cannot learn of the resource conflict, and continue to resend the sidelink data on the reserved resources. Consequently, the resource conflict cannot be resolved.

SUMMARY

This application provides a resource reselection assistance method and apparatus and a resource reselection method and apparatus, which may be applied to D2D or vehicle-to-everything V2X, or may be applied to the fields such as intelligent driving and intelligent connected vehicles.

According to a first aspect, an embodiment of this application provides a resource reselection assistance method. The method may be performed by a terminal, or may be performed by a combined device or component having a function of the terminal, or may be performed by a communications chip (for example, a processor, a baseband chip, or a chip system) applied to the terminal. The method includes: receiving control information from a first terminal, where the control information indicates a first resource and a second resource, the first resource carries first data corresponding to the control information, and the second resource is a sending resource reserved by the first terminal; determining that the second resource meets a reselection condition; and sending indication information to the first terminal, where the indication information indicates to reselect the second resource.

According to the method, after receiving the control information of the first terminal, an apparatus that performs the method determines that the second resource indicated by the control information meets the reselection condition, to determine whether a resource conflict exists in the second resource reserved by the first terminal. After determining that the second resource meets the reselection condition, the apparatus sends the indication information to the first terminal, where the indication information indicates to reselect the second resource. Therefore, when determining that a resource conflict exists in the second resource, the apparatus indicates the first terminal in time to reselect the second resource, to prevent the first terminal from continuing to use the second resource to send data. This resolves a resource conflict, and improves resource selection efficiency.

In a possible design, the control information includes resource reselection trigger information, and the resource reselection trigger information is used to trigger resource reselection assistance; and/or the method further includes: receiving resource reselection enabling information, where the resource reselection enabling information is used to enable the resource reselection assistance.

According to the foregoing design, the apparatus that performs the method may determine, in a plurality of manners, whether to perform resource reselection assistance. Specifically, when receiving the resource reselection trigger information sent by the first terminal by using the control information, the apparatus may trigger the resource reselection assistance method provided in this embodiment of this application, and/or when receiving the resource reselection enabling information, the apparatus may determine that resource reselection is enabled in a resource pool in which a resource indicated by the control information is located, and then perform resource reselection assistance.

In a possible design, the determining that the second resource meets a reselection condition includes: determining that the second resource and a third resource overlap, and a priority of the third resource is higher than a priority of the second resource; or determining that the second resource and the third resource overlap, and determining that a quantity of decoding failures of the first resource is greater than or equal to a first preset threshold; or determining that the second resource and the third resource overlap, and determining that the priority of the third resource is higher than the priority of the second resource and the priority of the third resource is higher than a preset priority threshold; or determining that the second resource and the third resource overlap, and determining that a signal power measurement value on a fourth resource is greater than a signal power measurement value on the first resource; or determining that the second resource and the third resource overlap, and determining that the signal power measurement value on the fourth resource is greater than a preset threshold, where the signal power measurement value may be an RSRP measurement result. The third resource is a sending resource reserved by a second terminal, and the fourth resource carries second data corresponding to second control information sent by the second terminal.

According to the foregoing design, the apparatus that performs the method can determine in time whether sending resources reserved by a plurality of terminals conflict, to prevent the plurality of terminals from using an overlapping sending resource to send data.

In a possible design, the indication information is a first sequence and a second sequence, the first sequence is used to carry an acknowledgment ACK corresponding to the first resource, and the second sequence is used to carry a negative acknowledgment NACK corresponding to the first resource; or the indication information is a third sequence, and the third sequence is different from the first sequence and the second sequence.

According to the foregoing design, this embodiment of this application provides indication information in a plurality of forms. Specifically, the indication information may be the first sequence used to carry the ACK corresponding to the first resource and the second sequence used to carry the NACK corresponding to the first resource, or the indication information may be the third sequence. Therefore, indication information in different forms can be flexibly used in different service scenarios, so that flexibility of the resource reselection assistance method is improved.

In a possible design, the indication information is the first sequence and the second sequence, and the sending indication information to the first terminal includes: sending the first sequence and the second sequence on a feedback resource in a first feedback resource set, where the first feedback resource set includes a feedback resource corresponding to the first resource in a resource occupied by a physical sidelink feedback control channel PSFCH.

According to the foregoing design, without changing the feedback resource for sending the first sequence and the second sequence, the apparatus that performs the method indicates the first terminal to reselect the second resource by simultaneously sending the first sequence and the second sequence on the feedback resource in the first feedback resource set.

In a possible design, the indication information is the third sequence, and the sending indication information to the first terminal includes: sending the third sequence on a first feedback resource in a first feedback resource set, where the first feedback resource and a feedback resource that is used to carry the first sequence or the second sequence overlap in frequency domain, and a phase of the third sequence is offset by a first reference value relative to a phase of the first sequence or a phase of the second sequence; or sending the third sequence on a second feedback resource in the first feedback resource set, where the second feedback resource and the feedback resource that is used to carry the first sequence or the second sequence are adjacent in the first feedback resource set, and the phase of the third sequence is the same as the phase of the first sequence or the phase of the second sequence. The first feedback resource set includes a feedback resource corresponding to the first resource in a resource occupied by a physical sidelink feedback control channel PSFCH.

$$(P_{ID} + M_{ID}) \bmod R_{PRB,CS}^{PSFCH} P_{ID} M_{ID} R_{PRB,CS}^{PSFCH}$$

In a possible design, the indication information is the third sequence, and the sending indication information to the first terminal includes:

$$(P_{ID} + M) \bmod R_{PRB,CS}^{PSFCH} P_{ID} M_{ID} R_{PRBCS}^{PSFCH}$$

sending the third sequence on a feedback resource in a second feedback resource set, where an index of the third sequence meets: is a physical layer source address identifier carried in the control information, is an identifier of the indication information, and is a quantity of sequences that can be transmitted on the feedback resource in the second feedback resource set. The second feedback resource set includes a feedback resource corresponding to a bit whose bit value is 0 in a bitmap corresponding to a resource occupied by a physical sidelink feedback control channel PSFCH.

In a possible design, the indication information is the third sequence, and the sending indication information to the first terminal includes:
sending the third sequence on a feedback resource in a second feedback resource set, where an index of the third sequence meets:

$$(P_{ID}) \bmod R_{PRBCS}^{PSFCH}, P_{ID}$$

is a physical layer source address identifier carried in the control information, and $$R_{PRBCS}^{PSFCH}$$

is a quantity of sequences that can be transmitted on the feedback resource in the second feedback resource set. The second feedback resource set includes a feedback resource corresponding to a bit whose bit value is 0 in a bitmap corresponding to a resource occupied by a physical sidelink feedback control channel PSFCH.

Optionally, when the apparatus that performs the method is not a target receiving terminal of the first terminal, there is no identifier for receiving the first data. In this case, the following may be defined: $M_{ID}=0$, and the index of the third sequence meets:

$$(P_{ID}) \bmod R_{PRBCS}^{PSFCH}.$$

In a possible design, the indication information is the third sequence, and the sending indication information to the first terminal includes: sending the third sequence on a feedback resource in a second feedback resource set, where the third sequence is the $1^{st}$ sequence carried on the $1^{st}$ feedback resource in the second feedback resource set. The second feedback resource set includes a feedback resource corresponding to a bit whose bit value is 0 in a bitmap corresponding to a resource occupied by a physical sidelink feedback control channel PSFCH.

Optionally, to reduce calculation complexity of the apparatus that performs the method or reduce parameters stored in the apparatus, the following may be further defined: $P_{ID}=0$. In this case, when $M_{ID}=0$ and $P_{ID}=0$, the third sequence is the $1^{st}$ sequence carried on the $1^{st}$ feedback resource in the second feedback resource set.

According to the foregoing design, when the indication information is the third sequence, a plurality of manners of sending the third sequence are provided, and the apparatus that performs the method may select, based on different service scenarios, different manners to send the third sequence. This improves flexibility of the resource reselection assistance method.

According to a second aspect, an embodiment of this application further provides a resource reselection method. The method may be performed by a terminal, or may be performed by a combined device or component having a function of the terminal, or may be performed by a communications chip (for example, a processor, a baseband chip, or a chip system) applied to the terminal. The method includes: sending control information to a third terminal, where the control information indicates a first resource and a second resource, the first resource carries first data corresponding to the control information, and the second resource is a sending resource reserved by a first terminal; receiving first indication information sent by the third terminal; and performing resource reselection on the second resource.

According to the method, when receiving the indication information sent by the third terminal, an apparatus that performs the method determines that the second resource meets a reselection condition, and performs resource reselection on the second resource, to prevent a resource conflict caused by sending data by using the second resource. This improves data sending accuracy and efficiency.

In a possible design, the control information further includes resource reselection trigger information, and the resource reselection trigger information is used to trigger the third terminal to perform resource reselection assistance.

According to the foregoing design, the control information sent by the apparatus that performs the method may further include the resource reselection trigger information, to trigger the third terminal to perform resource reselection assistance, to indicate the third terminal to determine whether the second resource indicated by the control information meets the reselection condition, to assist the apparatus that performs the method in performing resource reselection.

In a possible design, the receiving indication information sent by the third terminal includes: receiving a first sequence and a second sequence that are sent by the third terminal, where the first sequence is used to transmit an acknowledgment ACK corresponding to the first resource, and the second sequence is used to transmit a negative acknowledgment NACK corresponding to the first resource; or receiving a third sequence sent by the third terminal, where the third sequence is different from the first sequence and the second sequence.

According to the foregoing design, this embodiment of this application provides indication information in a plurality of forms. Specifically, the indication information may be the first sequence used to carry the ACK corresponding to the first resource and the second sequence used to carry the NACK corresponding to the first resource, or the indication information may be the third sequence. Therefore, the apparatus that performs the method can flexibly receive indication information in different forms in different service scenarios.

According to a third aspect, an embodiment of this application further provides a resource reselection method. The method may be performed by a terminal, or may be performed by a combined device or component having a function of the terminal, or may be performed by a communications chip (for example, a processor, a baseband chip, or a chip system) applied to the terminal. The method includes: sending control information to a third terminal, where the control information indicates a first resource and a second resource, the first resource carries first data corresponding to the control information, and the second resource is a sending resource reserved by a first terminal; determining that a quantity of times of receiving a negative acknowledgment NACK corresponding to the first resource is greater than a preset threshold; and performing resource reselection on the second resource.

According to the method, when the quantity of times of receiving the NACK corresponding to the first resource is greater than the preset threshold, the apparatus that performs the method determines that a resource conflict exists in the second resource, and performs resource reselection on the second resource. The apparatus that performs the method determines, based on the quantity of times of receiving the NACK corresponding to the first resource, whether to perform resource reselection, to prevent the apparatus that performs the method from still sending data by using the second resource when the third terminal fails to decode the first resource due to a resource conflict.

According to a fourth aspect, an embodiment of this application further provides a communications apparatus. The communications apparatus has functions of implementing the method according to the first aspect. The functions may be implemented by hardware, or may be implemented by hardware executing corresponding software. The hardware or the software includes one or more modules corresponding to the foregoing functions. In a possible design, a structure of the communications apparatus includes a receiving unit, a processing unit, and a sending unit. These units may perform corresponding functions in the method example according to the first aspect. For details, refer to the detailed descriptions in the method example. Details are not described herein again.

According to a fifth aspect, an embodiment of this application further provides a communications apparatus. The communications apparatus has functions of implementing the method according to the second aspect. The functions may be implemented by hardware, or may be implemented by hardware executing corresponding software. The hardware or the software includes one or more modules corresponding to the foregoing functions. In a possible design, a structure of the communications apparatus includes a receiving unit, a processing unit, and a sending unit. These units may perform corresponding functions in the method example according to the second aspect. For details, refer to the detailed descriptions in the method example. Details are not described herein again.

According to a sixth aspect, an embodiment of this application further provides a communications apparatus. The communications apparatus has functions of implementing the method according to the third aspect. The functions may be implemented by hardware, or may be implemented by hardware executing corresponding software. The hardware or the software includes one or more modules corresponding to the foregoing functions. In a possible design, a structure of the communications apparatus includes a processing unit and a sending unit. These units may perform corresponding functions in the method example according to the third aspect. For details, refer to the detailed descriptions in the method example. Details are not described herein again.

The communications apparatus in each of the foregoing aspect may be a terminal, or may be a chip applied to the terminal, or may be another combined device, component, or the like that can implement functions of the terminal. When the communications apparatus is a terminal, the transceiver module may be a transmitter and a receiver, or an integrated transceiver, and may include an antenna, a radio frequency circuit, and the like, and the processing module may be a processor, for example, a baseband chip. When the communications apparatus is a component having a function of the terminal, the transceiver module may be a radio frequency unit, and the processing module may be a processor. When the communications apparatus is a chip system applied to the terminal, the transceiver module may be an input/output interface of the chip system, and the processing module may be a processor in the chip system, for example, a central processing unit (central processing unit, CPU).

According to a seventh aspect, an embodiment of this application further provides a communications apparatus. A structure of the communications apparatus includes a communications module, a processor, and a memory. The processor is configured to support the communications apparatus in executing a corresponding function in the method according to the first aspect. The memory is coupled to the processor, and the memory stores necessary program instructions and necessary data. The communications module is configured to communicate with another device.

According to an eighth aspect, an embodiment of this application further provides a communications apparatus. A structure of the communications apparatus includes a communications module, a processor, and a memory. The processor is configured to support the communications apparatus in executing a corresponding function in the method according to the second aspect or the third aspect. The memory is coupled to the processor, and the memory stores necessary program instructions and necessary data. The communications module is configured to communicate with another device.

According to a ninth aspect, this application further provides a computer-readable storage medium. The computer-readable storage medium stores instructions, and when the instructions are run on a computer, the computer is enabled to perform all or some steps in the methods according to the first aspect to the third aspect.

According to a tenth aspect, this application further provides a computer program product including instructions, and when the computer program product runs on a computer, the computer is enabled to perform all or some steps in the methods according to the first aspect to the third aspect.

DETAILED DESCRIPTION OF ILLUSTRATIVE EMBODIMENTS

Figure 1:
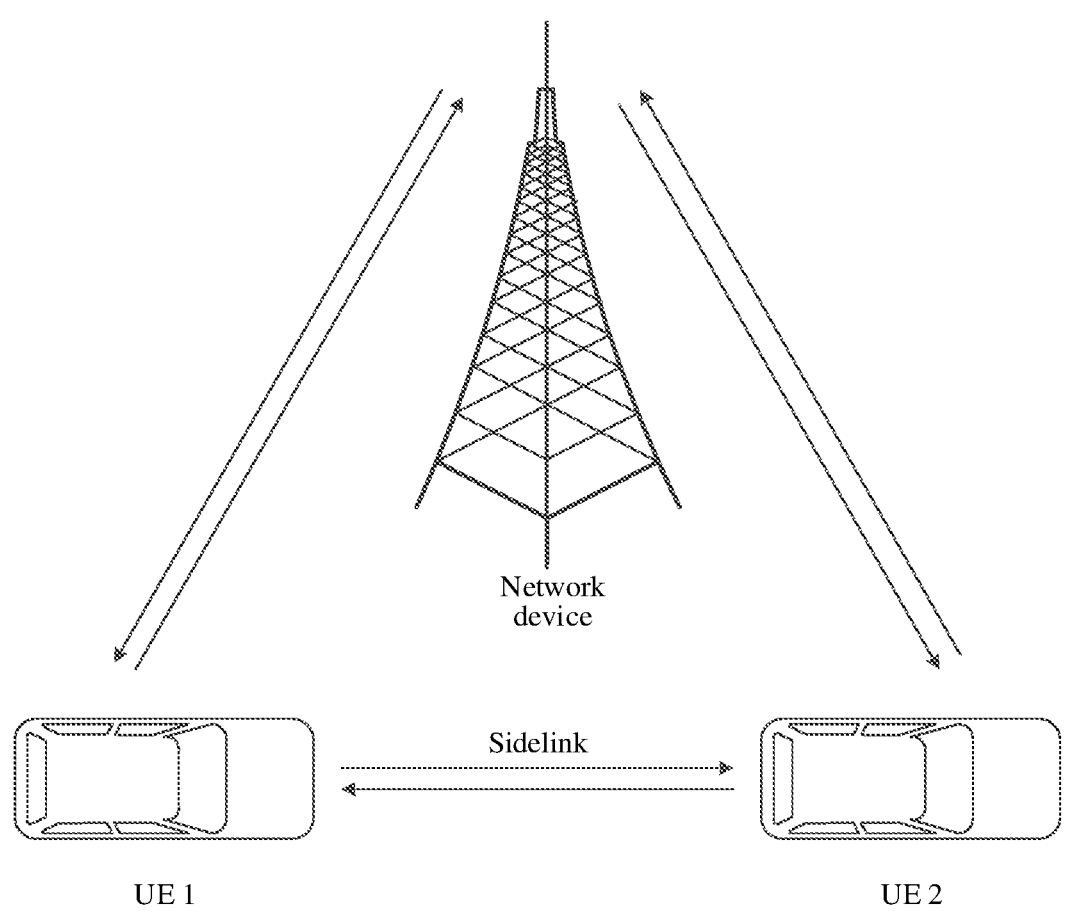
FIG. 1 is a schematic diagram of a network architecture according to an embodiment of this application.

To facilitate understanding of embodiments of this application, the following describes terms related to embodiments of this application.

(1) Terminal device: The terminal device includes a device that provides a user with voice and/or data connectivity, for example, may include a handheld device with a wireless connection function or a processing device connected to a wireless modem. The terminal device may communicate with a core network through a radio access network (RAN), and exchange a voice and/or data with the RAN. The terminal device may include user equipment (UE), a wireless terminal device, a mobile terminal device, a device-to-device (D2D) terminal device, a vehicle-to-everything (V2X) terminal device, a machine-to-machine/machine type communication (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, hand-held, or computer built-in mobile apparatus. For example, the terminal device may be a device such as a personal communications service (PCS) phone, a cordless telephone set, a session initiation protocol (SIP) phone, a wireless local loop (WLL) station, or a personal digital assistant (PDA). The terminal device alternatively includes a limited device, for example, a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

It should be noted that the various terminal devices described above all may be considered as V2X devices if the terminal devices are located in a vehicle (for example, placed in the vehicle or installed in the vehicle).

For ease of description, in the following descriptions and figures of this application, the terminal device may be referred to as a terminal or UE for short.

(2) Sidelink (SL): The sidelink may be applied to a D2D communication scenario and a V2X communication scenario. Sidelink communication is communication based on a PC5 interface, and resources used by the sidelink communication may be collectively referred to as sidelink resources.

(3) V2X: In Release (Rel) 14/15/16, V2X is successfully initiated as major application of a device-to-device (D2D) technology. On a basis of the existing D2D technology, to optimize a specific application requirement of V2X, V2X needs to further reduce an access delay of a terminal, to resolve a resource conflict.

Specifically, V2X further includes several application requirements such as vehicle-to-vehicle (V2V), vehicle-to-infrastructure (V2I), and vehicle-to-pedestrian (V2P) direct communication, and vehicle-to-network (V2N) communication interaction. V2V means communication between vehicles. V2P means communication between a vehicle and a person (including a pedestrian, a bicycle rider, a driver, or a passenger). V2I means communication between a vehicle and a network device, for example, a roadside unit (RSU). In addition, V2N may be included in V2I. V2N means communication between a vehicle and a base station/network.

(4) A term "and/or" describes an association relationship between associated objects and represents that three relationships may exist. For example, A and/or B may represent the following three cases: Only A exists, both A and B exist, and only B exists. A character "/" generally indicates an "or" relationship between the associated objects.

It should be noted that "a plurality" of in this application means two or more, and "at least one" means one or more.

In addition, it should be understood that, in descriptions of this application, terms such as "first" and "second" are merely used for distinguishing and description, but should not be understood as indicating or implying relative importance, or should not be understood as indicating or implying a sequence.

Technical solutions provided in embodiments of this application may be applied to an SL communication scenario, for example, a D2D scenario (which may be an NR D2D scenario or an LTE D2D scenario) or a V2X scenario (which may be an NR V2X scenario or an LTE V2X scenario), or may be applied to another scenario or another communications system. This is not specifically limited.

The following describes a network architecture to which embodiments of this application are applied. FIG. 1 shows a network architecture to which an embodiment of this application is applied.

The network architecture shown in FIG. 1 includes a network device and a plurality of terminals (a terminal 1 and a terminal 2 shown in FIG. 1). The following uses the terminal 1 and the terminal 2 as an example for description.

The two terminals may be covered by the network device; or only the terminal 1 may be covered by the network device, and the terminal 2 may be not covered by the network device; or the two terminals may be covered by different network devices. The two terminals may communicate with each other by using an SL. In FIG. 1, an example in which the two terminals are covered by one network device shown in FIG. 1 is used. The two terminals are V2X devices. Certainly, a quantity of terminals in FIG. 1 is only an example. During actual application, the network device may serve a plurality of terminals. The network device may be a base station.

Figure 2:
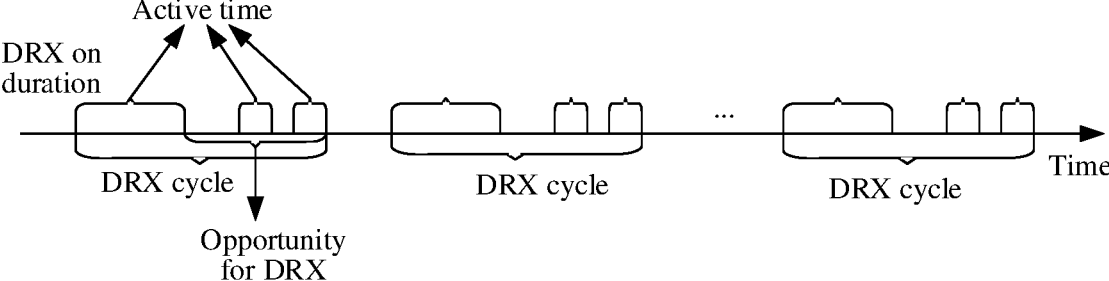
FIG. 2 is a schematic diagram of a DRX cycle according to an embodiment of this application.

Because data packets are not generated continuously, when no data is transmitted, the terminal may disable a receiving circuit of the terminal to reduce power consumption, to increase a use time of a mobile battery. Based on this, a discontinuous reception (DRX) technology is introduced to save power. A DRX cycle defines an active time (Active Time). As shown in FIG. 2, the active time includes DRX on duration (DRX On Duration) and an opportunity for DRX (opportunity for DRX). The DRX on duration is a time period in which the terminal needs to monitor and receive data sent by a physical downlink control channel (PDCCH). The opportunity for DRX is a time period of probably entering DRX, and may be configured by the network device.

The network device completes downlink synchronization with the terminal by using a downlink synchronization signal and a system configuration, and the terminal accesses the network device through uplink synchronization, to complete uplink synchronization with the base station. When the terminal has an energy saving requirement, the terminal reports an energy saving request to the network device, and the network device configures a related parameter such as a DRX cycle for the terminal in response to the energy saving request, to complete a DRX configuration for the terminal.

In an NR system, an SL connection mainly includes a physical sidelink control channel (PSCCH), a physical sidelink shared channel (PSSCH), a physical sidelink broadcast channel (PSBCH), and a physical sidelink feedback control channel (PSFCH). The PSCCH is used to transmit control information (SCI). The PSSCH channel is used to transmit data. The PSBCH carries MIB-V2X from an RRC layer. The PSFCH is used to carry feedback information sent by a receiving end to a transmitting end on an SL, which may be specifically an acknowledge character (ACK) form/a negative acknowledge character (NACK) form for sending an ACK or a NACK, or a NACK-only form for sending only a NACK.

Further, a manner of feeding back an ACK/a NACK on the PSFCH may be applied to unicast and multicast scenarios. In the unicast scenario, one transmitting end and one receiving end form one unicast connection pair. After receiving control information sent by the transmitting end, the receiving end determines, based on HARQ enabling indication information in the control information, that an ACK/a NACK needs to be fed back to the transmitting end terminal. If the receiving end determines that a received PSSCH can be correctly decoded, the receiving end sends a PSFCH sequence that carries ACK information to the transmitting end; otherwise, the receiving end feeds back a PSFCH sequence that carries NACK information.

The multicast scenario may include a scenario of multicast 1 (NACK-only) and a scenario of multicast 2 (NACK/ACK). In the scenario of multicast 1, if an intra-group terminal can correctly decode a PSCCH, but fails to decode a PSSCH corresponding to the PSCCH, the terminal feeds back a PSFCH sequence that carries NACK information; otherwise, the terminal feeds back no information. In the scenario of multicast 2, if an intra-group terminal can correctly decode a PSCCH, but fails to decode a PSSCH corresponding to the PSCCH based on HARQ enabling indication information in control information, the terminal feeds back a PSFCH sequence that carries NACK information; otherwise, the terminal feeds back a PSFCH sequence that carries ACK information.

When performing SL communication, the terminal needs to determine a PSSCH transmission resource. Specifically, the terminal sends first-level control information on the PSCCH, and sends second-level control information and first data on the PSSCH. The first-level control information carries frequency domain resource information of the PSSCH corresponding to the PSCCH, to indicate a size of a PSSCH frequency domain resource. The PSCCH and the PSSCH corresponding to the PSCCH are sent in a same slot in time domain, and resource start locations are the same in frequency domain. Therefore, after blindly detecting the PSCCH, the receiving end terminal may decode the PSSCH based on a time-frequency domain start location of the PSCCH and the PSSCH frequency domain resource information in the first-level control information. During specific implementation, for example, the network device is a base station. The PSSCH transmission resource is determined mainly by using two communication modes: a base station scheduling mode and an autonomous selection mode.

Figures 3, 4:
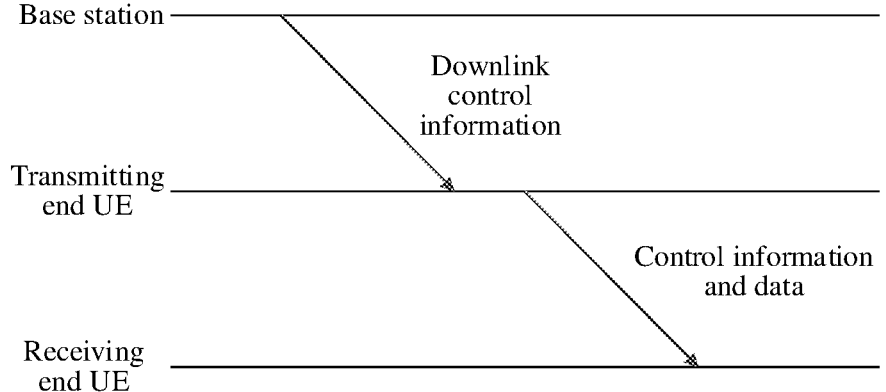
FIG. 3 is a schematic diagram of a network device scheduling mode according to an embodiment of this application.
FIG. 4 is a schematic diagram in which a transmitting end performs resource listening according to an embodiment of this application.

The base station scheduling mode is used for SL communication within coverage of the base station. The terminal uses a scheduled time-frequency resource as a PSSCH transmission resource based on scheduling information of the base station, and sends control information and data on the resource. As shown in FIG. 3, dynamic scheduling in the base station scheduling mode is used as an example to describe the base station scheduling mode. The base station centrally allocates resources based on a buffer status report (Buffer Status Report, BSR) status of the terminal. Specifically, the base station notifies the transmitting end of a time-frequency resource of sidelink data by using downlink control information (Downlink Control Information, DCI). After receiving the DCI, the transmitting end sends control information (Sidelink Control Information, SCI) and data to the receiving end on the resource indicated by the DCI. In the base station scheduling mode, sidelink transmission resources of all terminals are uniformly scheduled by the base station, so that collision can be avoided.

In the autonomous selection mode, the terminal autonomously selects a PSSCH time-frequency resource from available time-frequency resources included in an SL communication resource pool, and sends control information and data on the selected resource. In this mode, the terminal performs resource selection based on a listening result of the terminal, without depending on scheduling of the base station. Because the autonomous selection mode is not limited by network coverage, the transmitting end may also use this mode for communication when there is no network coverage. The following describes a specific manner in which the terminal performs resource listening in the autonomous selection mode.

As shown in FIG. 4, the transmitting end triggers resource selection in a slot n. A resource listening window may be defined as T slots before the resource selection is triggered. A resource selection window is a slot corresponding to [n+T1, n+T2] after the resource selection is triggered. The transmitting end listens, in the resource listening window, to SCI sent by another terminal in a frequency domain resource pool. If the detected SCI includes a resource that has been reserved by the another terminal, and the reserved resource is located in the resource selection window [n+T1, n+T2], the transmitting end performs PSSCH reference signal received power (Reference Signal Received Power, RSRP) measurement on a candidate resource corresponding to the reserved resource. If a measurement result is greater than a preset RSRP threshold $Th_{RSRP}$, the candidate resource is excluded from the resource selection window. Herein, $Th_{RSRP}$ is determined based on a priority corresponding to data indicated in the received SCI and a priority corresponding to to-be-sent data of the transmitting end. After excluding the candidate resource whose measurement result is greater than preset $Th_{RSRP}$ from the resource selection window, the transmitting end selects a transmission resource from a set of remaining candidate resources. For example, in the resource listening window shown in FIG. 4, the transmitting end obtains, through listening on a resource 1, a resource 2, and a resource 3, SCI sent by another terminal, and PSSCH-RSRP of the SCI exceeds $Th_{RSRP}$. In this case, the transmitting end excludes these resources during resource selection, and selects a resource other than the resources 1, 2, and 3 in the resource selection window shown in FIG. 4 to perform sidelink transmission. The transmitting end selects a transmission resource based on a listening result, and sends control information and data to the receiving end on the selected resource.

Figure 5:
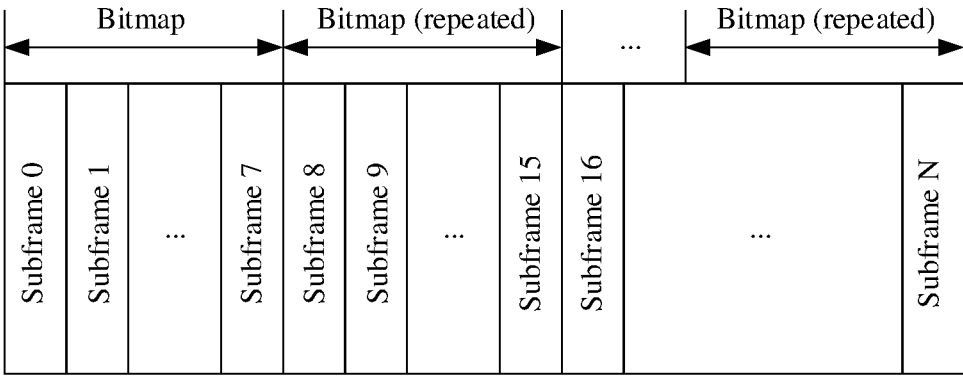
FIG. 5 is a schematic diagram in which a network device indicates a bitmap of a PSSCH time domain resource according to an embodiment of this application.

Further, during SL communication, the terminal selects a time-frequency resource based on the SL communication resource pool. The SL communication resource pool is a set of time domain resources and frequency domain resources used for SL communication. For a time domain resource, the network device indicates, by using a periodically repeated bitmap, a set of subframes that can be used for SL communication. For example, as shown in FIG. 5, it is assumed that a length of a bitmap of one period is 8 bits, and SL transmission in each subframe occupies M fixed orthogonal frequency division multiplexing (Orthogonal Frequency Division Multiplexing, OFDM) symbols. In this case, M is defined as one piece of SL transmission duration, or M may be referred to as a time domain transmission unit.

For a frequency domain resource, the network device divides a frequency band used for SL communication into several sub-channels, and each sub-channel includes a specific quantity of physical resource blocks (PRB).

Figure 6:
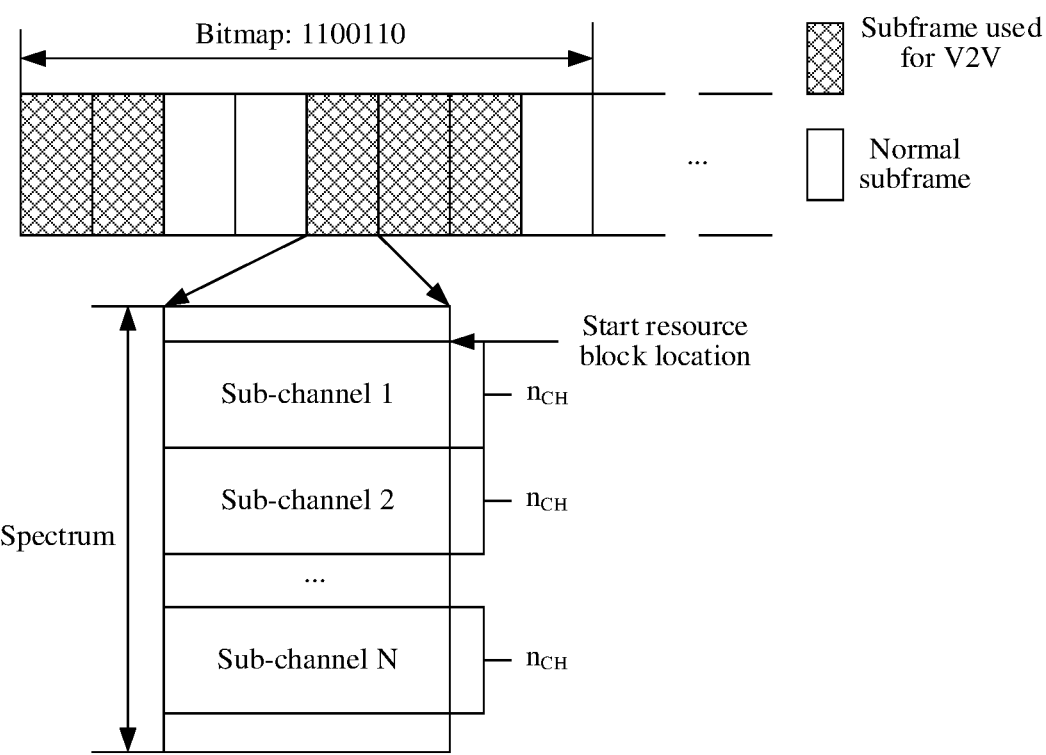
FIG. 6 is a schematic diagram in which a network device indicates a PSSCH frequency domain resource according to an embodiment of this application.

As shown in FIG. 6, the network device indicates a sequence number of the $1^{st}$ PRB of a frequency resource used for SL communication, a total quantity N of sub-channels included in a communication resource pool, and a quantity $n_{CH}$ of PRBs included in each sub-channel. It should be noted that one transmission of SL communication may occupy one or more sub-channels.

During SL communication, physical layer HARQ-ACK feedback is further supported, and HARQ feedback information is sent through a PSFCH. To be specific, for one PSSCH transmission, if the transmitting end adds HARQ-ACK feedback enabling information to control information, the receiving end needs to feed back corresponding ACK/NACK information based on a current PSSCH decoding result. The ACK/NACK information is transmitted through the PSFCH channel. A PSFCH channel resource is a periodic resource configured in the resource pool, and a periodic configuration parameter $$N_{PCSSH}^{PSFCH}$$

of the PSFCH channel resource may be 0, 1, 2, or 4. If $$N_{PSSCH}^{PSFCH} = 0,$$

it indicates that there is no PSFCH resource configuration in the resource pool, PSFCH sending is not enabled on the resource, and physical layer HARQ feedback is not supported. If $$N_{PSSCH}^{PSFCH} = 1, 2, \text{ or } 4,$$

it indicates that there is one PSFCH feedback slot every $$N_{PSSCH}^{PSFCH}$$

Figure 7:
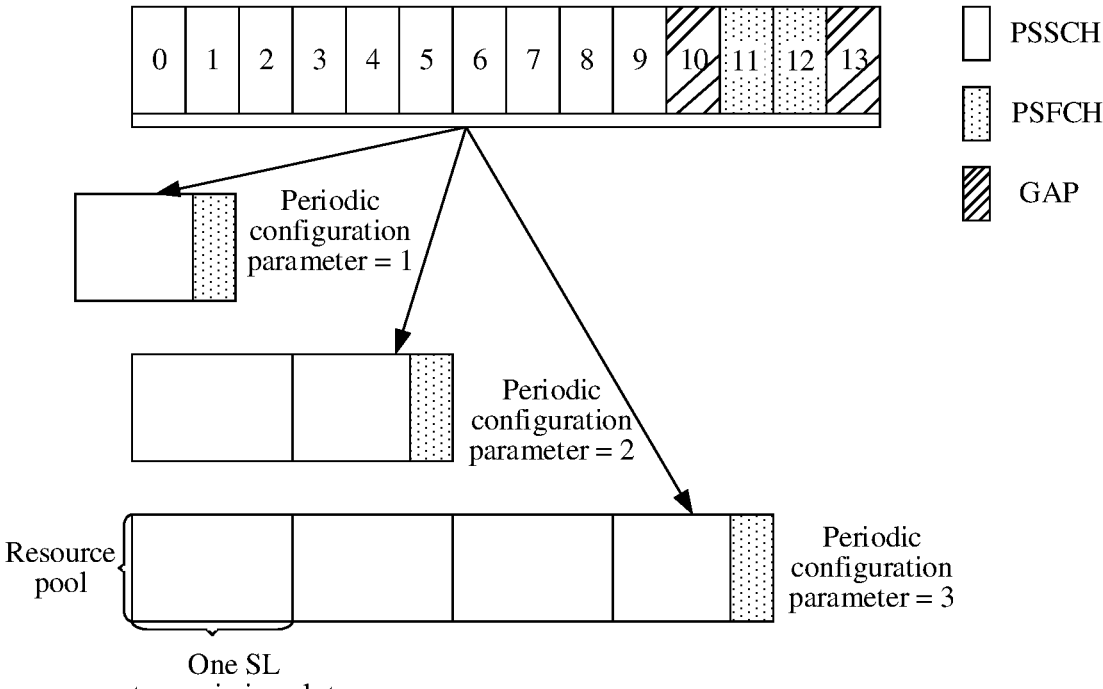
FIG. 7 is a schematic diagram of a PSFCH occupation slot according to an embodiment of this application.

SL slots in one time window. For example, as shown in FIG. 7, in a slot in which a PSFCH is located, the PSFCH occupies the last two OFDM symbols before the last guard interval symbol (GAP). An available frequency domain bandwidth of the PSFCH channel resource is the same as a bandwidth of the resource pool.

Figures 8, 9:
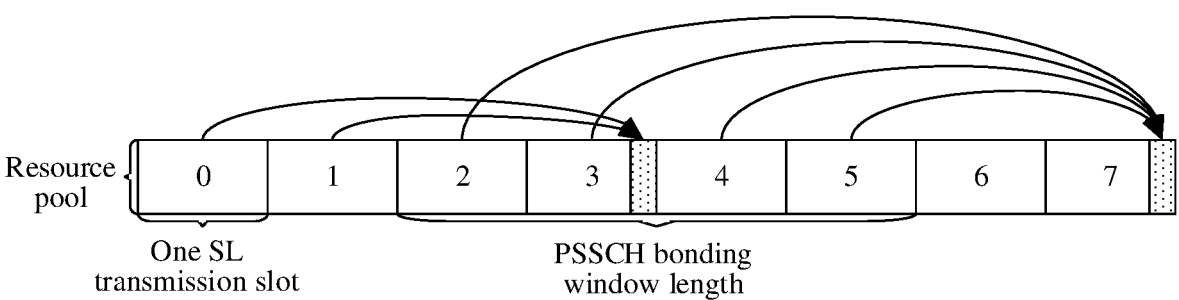
FIG. 8 is a schematic diagram of a bitmap of a PSFCH frequency domain resource according to an embodiment of this application.
FIG. 9 is a schematic diagram of a time interval between a PSSCH slot and a PSFCH slot according to an embodiment of this application.

Because the terminal needs to autonomously select a PSSCH sending resource based on a listening result of the terminal in the autonomous selection mode, to simplify a PSFCH resource selection process, a PSFCH feedback resource is configured for each PSSCH sub-channel. Specifically, a manner of determining the PSFCH resource corresponding to each PSSCH sub-channel is as follows:

A bitmap of a PSFCH frequency domain resource is configured in the resource pool, to indicate whether a PRB on a frequency domain resource in which the resource pool is located can be used as a PSFCH resource. To be specific, a length of bit information included in the bitmap is equal to a quantity of PRBs in the resource pool. In the bitmap, a bit value 1 indicates that a corresponding PRB can be used for PSFCH transmission, and a bit value 0 indicates that a corresponding PRB resource cannot be used for PSFCH transmission. As shown in FIG. 8, in a slot having a PSFCH transmission resource, assuming that one sub-channel includes 10 PRBs, and a resource pool includes three sub-channels in total, a bitmap indicating a PSFCH frequency domain resource in the resource pool includes 3*10=30 bits in total, to indicate whether each PRB can be used for PSFCH transmission. For example, as shown in FIG. 8, the bitmap indicates that the first four PRBs of each sub-channel may be used as PSFCH feedback.

$$N_{subch} M_{PRB,slot}^{PSFCH} = M_{PRB,set}^{PSFCH} / \left( N_{subch} * N_{PSSCH}^{PSFCH} \right)$$

Because every N PSSCH slots correspond to one PSFCH feedback slot, for a resource pool including sub-channels, a quantity of PSFCH feedback resources corresponding to each sub-channel is:

$$N_{subch} M_{PRB,slot}^{PSFCH} = M_{PRB,set}^{PSFCH} / \left( N_{subch} * N_{PSSCH}^{PSFCH} \right) \qquad \text{Formula 1}$$

Herein, $M_{PRB,set}^{PSFCH}$ represents a quantity of PRBs that can be used for transmission in the PSFCH frequency domain resource, that is, a total quantity of bits whose values each are 1 in the bitmap indicating the PSFCH frequency domain resource.

Figure 10:
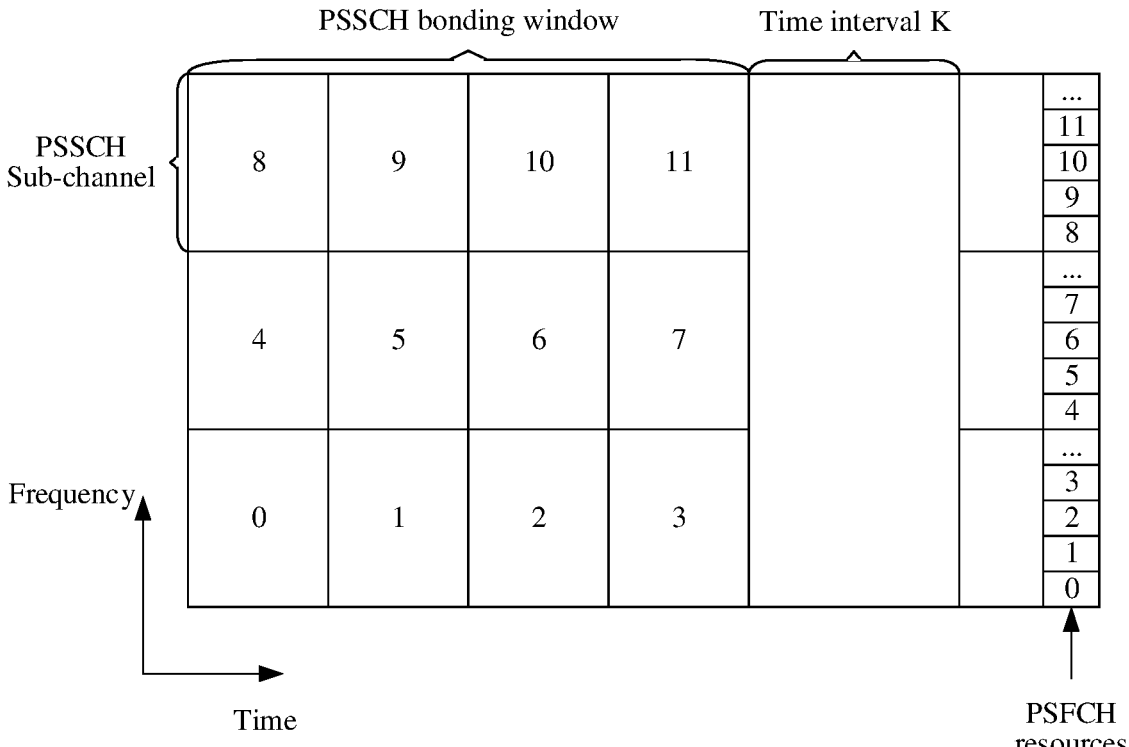
FIG. 10 is a schematic diagram of a PSSCH resource and a corresponding PSFCH according to an embodiment of this application.

Due to a limitation of a decoding capability of the receiving end, the receiving end cannot immediately perform feedback after receiving a PSSCH. Therefore, a PSSCH feedback time interval K is defined. To be specific, the PSSCH transmits a PSFCH in the $1^{st}$ available slot including a PSFCH resource, there are at least K slots between the slot and a slot in which the PSSCH is located, and a value of K is configured by the resource pool. As shown in FIG. 9, when K=2, PSSCHs carried in slots 0 and 1 may be fed back on a PSFCH resource in a slot 3, and PSSCHs carried in slots 2, 3, 4, and 5 are fed back on a PSFCH resource in a slot 7. In addition, because the slots 2, 3, 4, and 5 are fed back on a PSFCH resource in one slot, the slots 2 to 5 may be referred to as one PSSCH bonding window length.

$$N_{PSSCH}^{PSFCH} M_{PRB,slot}^{PSFCH} =$$
$$1 \left[ \left( i + j * N_{PSSCH}^{PSFCH} \right) * M_{PRB,slot}^{PSFCH}, \left( i + 1 + j * N_{PSSCH}^{PSFCH} \right) * M_{PRB,slot}^{PSFCH} - 1 \right] PSFCH$$

available resources in one PSFCH feedback slot are sequentially allocated to each PSSCH sub-channel in a feedback period in a manner in which time domain of PSSCH resources is followed by frequency domain. Specifically, as shown in FIG. 10, when =4, and, a PSFCH resource corresponding to each PSSCH sub-channel in four bonded PSSCH slots is shown by a number in FIG. 10, that is, a PSFCH feedback resource of one PRB is allocated to each PSSCH sub-channel in each slot. In terms of formula representation, for the $i^{th}$ slot in N bonded PSSCH slots, if a number of a frequency domain sub-channel in a resource pool of the $i^{th}$ slot is j, a PSFCH resource corresponding to the frequency domain sub-channel is:

$$N_{PSSCH}^{PSFCH} M_{PRB,slot}^{PSFCH} = \qquad \text{Formula 2}$$
$$1 \left[ \left( i + j * N_{PSSCH}^{PSFCH} \right) * M_{PRB,slot}^{PSFCH}, \left( i + 1 + j * N_{PSSCH}^{PSFCH} \right) * M_{PRB,slot}^{PSFCH} - 1 \right]$$

Formula 2 indicates that PRB resources corresponding to $$M_{PRB,slot}^{PSFCH}$$

US 12,677,256 B2

15 contiguous bits 1 are allocated to each PSSCH sub-channel in each slot, where $$0 \le i \le N_{PSSCH}^{PSFCH} - 1,$$

and $0 \le j \le N_{subch}-1$. For example, as shown in FIG. 10, $0 \le i \le 3$, and $0 \le j \le 2$. If a user occupies one PSSCH sub-channel for transmission, for example, a frequency domain sub-channel numbered 5 in FIG. 10, and for the frequency domain sub-channel numbered 5, i=1, and j=1, it can be learned through calculation according to Formula 2 that a PSFCH resource corresponding to the frequency domain sub-channel numbered 5 is a PRB numbered 5 in the figure. If the user occupies two PSSCH sub-channels for transmission, for example, PSSCH sub-channels numbered 5 and 9 in FIG. 10, where for the PSSCH sub-channel numbered 5, i=1, and j=1, and for the PSSCH sub-channel numbered 9, i=1, and j=2, it can be learned through calculation according to Formula 2 that PSFCH resources corresponding to the PSSCH sub-channels numbered 5 and 9 are respectively PRBs numbered 5 and 9 in the figure, and the two PRBs are not contiguous on a frequency domain physical resource.

$r(n)$, $0 \le n \le M_{ZC}$ $M_{ZC}r(n)r^\alpha(n)=r*e^{j\alpha n}$ where $0 \le n \le M_{ZC}$ The PSFCH is a ZC sequence based on a low peak-to-average ratio. A specific sequence generation manner is: generating a basic sequence based on a sequence length, where is the sequence length; and $r(n)$, $0 \le n \le M_{ZC}$ $M_{ZC}r(n)r^\alpha(n)=r*e^{j\alpha n}$ where $0 \le n \le M_{ZC}$ performing phase rotation on the basic sequence according to the following formula, to generate a sequence with a low peak-to-average ratio that can be multiplexed:

$$r(n), 0 \le n \le M_{ZC}M_{ZC}r(n)r^a(n) = r*e^{jan} \text{ where}$$

Formula 3

$$0 \le n \le M_{ZC}$$

It can be learned according to the foregoing formula that a plurality of terminals may generate distinguishable PSFCH sequences by using different phase rotation values $\alpha$, and each PSFCH sequence is code-division multiplexed on one PRB for sending. For example, when the terminals need to feed back ACK and NACK information, at least two sequences are allocated to one terminal, which respectively correspond to different phase rotation values $\alpha$.

$$\alpha\alpha = \frac{2\pi}{N_{sc}^{RB}}\left((m_0 + m_{cs} + n_{cs}(n_{s,f}^\mu l + l'))\text{mod}N_{SC}^{RB}\right)$$

During specific implementation, the phase rotation value may be determined according to the following formula:

$$\alpha\alpha = \frac{2\pi}{N_{sc}^{RB}}\left((m_0 + m_{cs} + n_{cs}(n_{s,f}^\mu, l + l'))\text{mod}N_{SC}^{RB}\right)$$

Formula 4

Herein, $$N_{sc}^{RB}$$

16 represents a quantity of subcarriers in one RB, and the value is defined as 12 in the NR system;

$$n_{s,f}^\mu$$

represents a slot number (slot number) corresponding to a current subcarrier spacing μ in one radio frame; 1 represents a number of an OFDM symbol in a PSFCH transmission slot, and l=0 represents an index of a symbol relative to the $1^{st}$ OFDM symbol on a current PSFCH transmission resource; $m_0$ represents a phase of a PSFCH sequence for ACK transmission; and $m_{cs}$ represents a phase offset of a PSFCH sequence for NACK transmission relative to the PSFCH sequence for ACK transmission. NR-V2X supports physical layer PSFCH feedback in the unicast and multicast scenarios. For different service types, a value of $m_{cs}$ is determined based on Table 1 and Table 2.

TABLE 1

PSFCH sequence phase mapping relationship in the
unicast scenario and the scenario of multicast 2

| HARQ-ACK value | 0 | 1 |
|---|---|---|
| Sequence cyclic shift | $m_{cs} = 0$ | $m_{cs} = 6$ |

TABLE 2

Feedback relationship in PUCCH formato with an SR request
and HARQ information in the scenario of multicast 1

| HARQ-ACK value | 0 | 1 |
|---|---|---|
| Sequence cyclic shift | $m_{cs} = 0$ | N/A |

During specific implementation, if one PSSCH occupies $$N_{subch}^{PSSCH}$$

sub-channels, the PSSCH corresponds to $$N_{subch}^{PSSCH} * M_{subch,slot}^{PSFCH} * N_{CS}^{PSFCH}$$

PSFCH sequence pairs, where $$N_{CS}^{PSFCH}$$

represents a quantity of PSFCH sequence pairs that can be multiplexed on a PSFCH resource of one PRB configured by the resource pool, and $$N_{subch,slot}^{PSFCH}$$

represents a quantity of PRBs that can be used as PSFCH resources and that correspond to each PSSCH sub-channel. In addition, the resource pool may further configure $N_{type}^{PSFCH}$ to limit a quantity of PSFCH resources that can be used by a receiving end of the PSSCH. There are two solutions below:

If the resource pool configures $$N_{type}^{PSFCH} = 1,$$

the receiving end of the PSSCH can use only a PSFCH resource corresponding to the $1^{st}$ sub-channel of the PSSCH, that is, $$R_{PRB,CS}^{PSFCH} = M_{subch,slot}^{PSFCH} * N_{CS}^{PSFCH}.$$

For example, in the schematic diagram of PSFCH resource allocation shown in FIG. 10, when the PSSCH occupies the two sub-channels numbered 5 and 9 to transmit data, the receiving end of the PSSCH can use only a PSFCH resource numbered 5 to perform feedback.

If the resource pool configures $$N_{type}^{PSFCH} = N_{subch}^{PSFCH},$$

the receiving end of the PSSCH can use PSFCH resources corresponding to all sub-channels of the PSSCH to perform feedback, that is, $$R_{PRB,CS}^{PSFCH} = N_{subch}^{PSSCH} * M_{subch,slot}^{PSFCH} * N_{CS}^{PSFCH}.$$

$$(P_{ID} + M_{ID}) \mathrm{mod} R_{PRB,CS}^{PSFCH} P_{ID} M_{ID} M_{ID} M_{ID} =$$

$$0 R_{PRB,CS}^{PSFCH} (P_{ID} + M_{ID}) \mathrm{mod} R_{PRB,CS}^{PSFCH} ((P_{ID} +$$

$$M_{ID}) \mathrm{mod} R_{PRB,CS}^{PSFCH}) \mathrm{mod} (R_{PRB,CS}^{PSFCH} / N_{CS}^{PSFCH})$$

The receiving end selects a resource corresponding to the ( )$^{th}$ (Formula 5) PSFCH resource pair to feed back the PSFCH, where represents a physical layer source address identifier carried in control information. For multicast 2, is an identifier configured by a higher layer of each receiving end for current PSSCH receiving. It may be understood that is an identifier used by the receiving end to receive data sent by the transmitting end, and is also an identifier used by the receiving end to send feedback information to the transmitting end. In another scenario. In addition, PSFCH resource pairs are mapped to all PSFCH sequences in ascending order in which a frequency domain index is followed by a code domain index. After an index of the PSFCH sequence is determined, a corresponding PRB index and a sequence phase can be determined based on the index of the PSFCH sequence. Further, when the index of the PSFCH sequence is, the corresponding PRB index may be determined according to the following formula:

$$(P_{ID} + M_{ID}) \mathrm{mod} R_{PRB,CS}^{PSFCH} P_{ID} M_{ID} M_{ID} M_{ID} = \qquad \text{Formula 6}$$

$$0 R_{PRB,CS}^{PSFCH} (P_{ID} + M_{ID}) \mathrm{mod} R_{PRB,CS}^{PSFCH} ((P_{ID} +$$

$$M_{ID}) \mathrm{mod} R_{PRB,CS}^{PSFCH}) \mathrm{mod} (R_{PRB,CS}^{PSFCH} / N_{CS}^{PSFCH})$$

$$m_0 \lfloor (P_{ID} + M_{ID}) \mathrm{mod} R_{PRB,CS}^{PSFCH} / (R_{PRB,CS}^{PSFCH} / N_{CS}^{PSFCH}) \rfloor$$

On the determined PRB, corresponding to the PSFCH sequence is:

$$m_0 \lfloor (P_{ID} + M_{ID}) \mathrm{mod} R_{PRB,CS}^{PSFCH} / (R_{PRB,CS}^{PSFCH} / N_{CS}^{PSFCH}) \rfloor \qquad \text{Formula 7}$$

Herein, $P_{ID}$ represents a physical layer source address identifier carried in control information, $M_{ID}$ is an identifier used to receive data sent by the transmitting end, $$R_{PRB,CS}^{PSFCH}$$

is a quantity of PSFCH sequences that can be transmitted on a PRB in a first feedback resource set, and $$N_{CS}^{PSFCH}$$

represents a quantity of PSFCH sequence pairs that can be multiplexed on a PSFCH resource of one PRB configured by the resource pool.

It can be learned from the foregoing content that the transmitting end needs to send resource reservation information to the receiving end before transmitting the SL data on the PSSCH. The transmitting end listens, in a resource listening window, to SCI sent by another transmitting end in a frequency domain resource pool, deletes, from a candidate resource pool, a resource that has been reserved by the another transmitting end and whose reference signal received power is greater than a preset threshold, and then selects an available resource for resource reservation. However, when the two transmitting ends are far away from each other and cannot listen to SCI sent by each other, resources reserved by the two transmitting ends for the receiving end may overlap, causing a resource conflict. In this case, resource overlapping may mean that some sub-channels overlap or all resources overlap. When sending resources for sending SL data by the two transmitting ends conflict, the receiving end feeds back, through only the PSFCH, a response message corresponding to the SL data, and the transmitting ends cannot learn of the resource conflict, and continue to resend the SL data on the reserved resources. Consequently, the resource conflict cannot be resolved.

Figure 11:
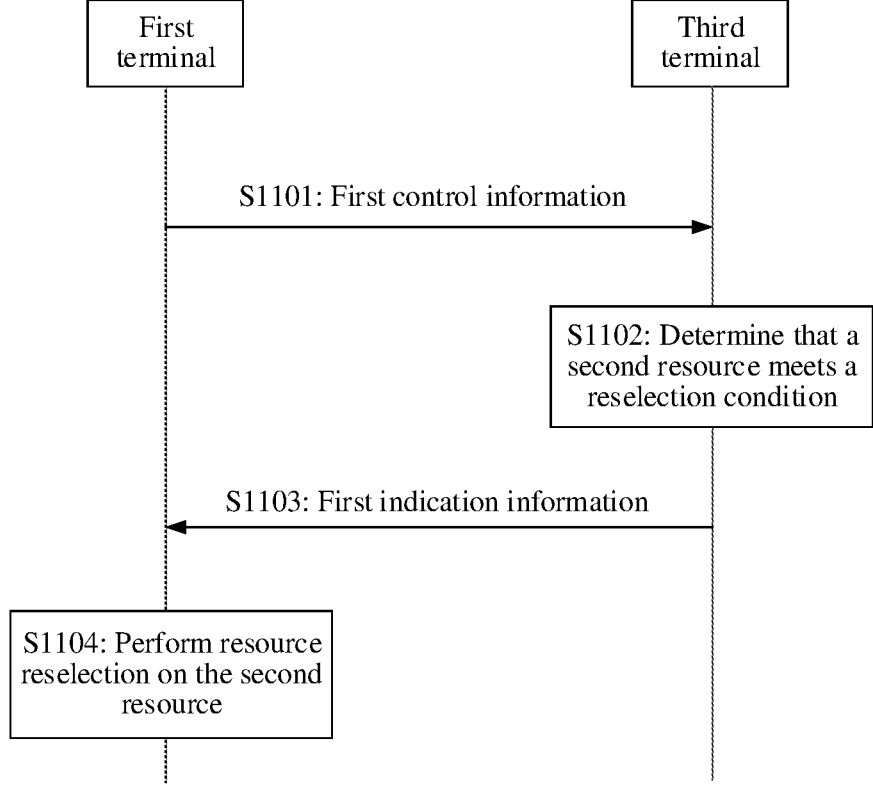
FIG. 11 is a flowchart of a resource reselection assistance method according to an embodiment of this application.

Based on the foregoing problem, an embodiment of this application provides a resource reselection assistance method, to resolve a resource conflict. The method may be performed by a terminal, or may be performed by a combined device or component having a function of the terminal, or may be performed by a communications chip (for example, a processor, a baseband chip, or a chip system) applied to the terminal. An example in which the method is performed by a terminal is used below for description. As shown in FIG. 11, the method includes the following steps.

S1101: A first terminal sends first control information to a third terminal.

It should be noted that the first control information sent by the first terminal indicates a first resource and a second resource, the first resource carries first data corresponding to the first control information, and the second resource is a resource reserved by the first terminal. Specifically, the second resource is located after the first resource in terms of time, and is a resource reserved by the first terminal for sending data in a next sending period.

Optionally, after receiving the first control information, the third terminal determines that resource reselection assistance needs to be performed.

Specifically, that resource reselection assistance needs to be performed means that the third terminal needs to determine whether a resource conflict exists in the second resource of the first terminal, and sends first indication information to the first terminal when determining that a resource conflict exists in the second resource.

In an optional implementation, the third terminal determines, in at least one of the following manners, that resource reselection assistance needs to be performed:

Manner 1: The first control information includes resource reselection trigger information, and the resource reselection trigger information is used to trigger the third terminal to perform resource reselection assistance.

During specific implementation, the first control information includes the resource reselection trigger information, to indicate that the first terminal needs the third terminal to assist in resource reselection.

Manner 2: The third terminal receives resource enabling information, where the resource reselection enabling information is used to enable the resource reselection assistance.

During specific implementation, when a resource pool corresponding to the first resource enables resource reselection, the resource reselection enabling information is sent to the third terminal, so that the third terminal determines, after receiving the resource reselection enabling information, that the first terminal needs to be assisted in resource reselection.

S1102: The third terminal determines that the second resource meets a reselection condition.

During specific implementation, the third terminal receives second control information from a second terminal, where the second control information indicates a third resource and a fourth resource, the fourth resource carries second data corresponding to the second control information, and the third resource is a sending resource reserved by the second terminal. The third terminal determines that the second resource and the third resource overlap. Specifically, the second resource and the third resource overlap or partially overlap. The third terminal determines, in at least one of the following manners, that the second resource meets the reselection condition:

Manner 1: A priority of the third resource is higher than a priority of the second resource.

For example, a priority value ranges from 1 to 8, a priority value 1 indicates a highest priority, and a priority value 8 indicates a lowest priority. When determining that the third resource and the second resource overlap, the third terminal preferentially receives control information or data sent on a resource of a higher priority. If a priority value of the second resource is 5, and a priority value of the third resource is 2, the third terminal determines that the priority of the third resource is higher than the priority of the second resource, and determines that the second resource meets the reselection condition.

Manner 2: The third terminal determines that a quantity of decoding failures of the first resource is greater than or equal to a first preset threshold.

It should be noted that the first preset threshold is a positive integer greater than 0. When the first preset threshold is 1, it indicates that, when determining that the first resource fails to be decoded, the third terminal determines that the second resource meets the reselection condition. When the first preset threshold is N, it indicates that, when determining that a quantity of consecutive decoding failures of the first resource is greater than or equal to N, the third terminal determines that the second resource meets the reselection condition.

Manner 3: The third terminal determines that the priority of the third resource is higher than the priority of the second resource and the priority of the third resource is higher than a preset priority threshold, where the third resource is a sending resource reserved by the second terminal.

It should be noted that the preset priority threshold is a priority threshold preconfigured for the third terminal. When a priority of a reserved resource of a terminal is higher than the priority threshold, the terminal preferentially occupies the reserved resource.

Manner 4: The third terminal determines that a signal power measurement value on the fourth resource is greater than a signal power measurement value on the first resource, where the signal power measurement value may be an RSRP measurement result.

Manner 5: The third terminal determines that the signal power measurement value on the fourth resource is greater than a preset threshold.

It should be noted that, during implementation, the third terminal may determine, in any one of Manner 1 to Manner 5, that the second resource meets the reselection condition. Alternatively, the third terminal may determine, in two or more of the foregoing manners, that the second resource meets the reselection condition. In other words, when conditions corresponding to the two or more of the foregoing manners are met, the third terminal determines that the second resource meets the reselection condition. For example, when determining, in Manner 4 and Manner 5, that the second resource meets the reselection condition, and when determining that the signal power measurement value on the fourth resource is greater than the signal power measurement value on the first resource and the signal power measurement value on the fourth resource is greater than the preset threshold, the third terminal determines that the second resource meets the reselection condition.

It may be understood that, when the third terminal determines that the second resource meets the reselection condition, that is, determines that a resource conflict exists in the second resource, the third terminal needs to indicate the first terminal to perform resource reselection on the second resource. Resource reselection means that the first terminal re-listens to and re-selects a resource in a resource pool to use the re-selected resource as the second resource.

S1103: The third terminal sends the first indication information to the first terminal, where the first indication information indicates to reselect the second resource.

During specific implementation, the third terminal determines, in the following manner, a time-frequency resource for sending the first indication information:

For a time domain resource, the time domain resource used by the third terminal to send the first indication information occupies the last two OFDM symbols before the last GAP in a slot in which a PSFCH is located.

For a frequency domain resource, it can be learned from the foregoing content that, when feedback information is sent through the PSFCH, a resource used for PSFCH transmission is determined based on a bitmap of a PSFCH frequency domain resource configured in the resource pool. In the bitmap, a bit value 1 indicates that a PRB corresponding to the bit can be used for PSFCH transmission, and a bit value 0 indicates that a PRB corresponding to the bit cannot be used for PSFCH transmission.

In this embodiment of this application, a set of PRBs that correspond to the first resource in a PRB resource set and that correspond to bits whose bit values are 1 is referred to as a first feedback resource set, and a set of PRBs corresponding to bits whose bit values are 0 is referred to as a second feedback resource set.

For example, as shown in FIG. 10, when $$N_{PSSCH}^{PSFCH} = 4,$$

and $$M_{PRB,slot}^{PSFCH} = 1,$$

that is, when a PSFCH feedback resource of one PRB is allocated to each PSSCH sub-channel in each slot, if the control information sent by the first terminal indicates that the first resource occupies the PSSCH sub-channels numbered 5 and 9 in the figure, the first resource corresponds to the PRBs numbered 5 and 9, that is, the first feedback resource set includes the PRBs numbered 5 and 9 in FIG. 10.

As shown in FIG. 8, the PSFCH occupies OFDM symbols numbered 11 and 12, and in a frequency domain resource corresponding to the PSFCH, a set of PRBs corresponding to bits whose bit values are 0 is referred to as a second feedback resource set, and PRBs in dashed lines in FIG. 8 form the second feedback resource set.

In a possible implementation, the first indication information is a first sequence and a second sequence, the first sequence is used to transmit an acknowledgment ACK corresponding to the first resource, and the second sequence is used to transmit a negative acknowledgment NACK corresponding to the first resource.

It is known that, in a unicast scenario and a scenario of multicast 2, when the third terminal can correctly decode the first resource, the third terminal feeds back the ACK to the first terminal by using the first sequence; otherwise, the third terminal feeds back the NACK to the first terminal by using the second sequence. Therefore, in this implementation, it is determined that the third terminal simultaneously sends the first sequence and the second sequence to the first terminal if the third terminal determines that the second resource meets the reselection condition.

Further, the third terminal sends the first sequence and the second sequence on corresponding PRB resources in the first feedback resource set.

For specific implementation, refer to the content described in Formula 3 to Formula 7 and Table 1. Details are not described herein again.

In another possible implementation, the first indication information is a third sequence, and the third sequence is different from the first sequence and the second sequence.

During specific implementation, when the first indication information is the third sequence, the third terminal may send the third sequence in the following manners:

Manner 1: The third terminal sends the third sequence on a first PRB in the first feedback resource set, where the first PRB and a PRB that is used to carry the first sequence or the second sequence are the same, and a phase of the third sequence is offset by a first reference value relative to a phase of the first sequence or a phase of the second sequence.

It should be noted that a sequence phase may be specifically a phase rotation value $\alpha$. It can be learned from the foregoing content that the phase rotation value $\alpha$ may be determined based on $m_0$ and/or $m_{cs}$, where $m_0$ may be a phase of the $1^{st}$ sequence in a PSFCH sequence pair on a PRB, and $m_{cs}$ is a phase offset of the $2^{nd}$ sequence relative to the $1^{st}$ sequence in the PSFCH sequence pair.

In a possible implementation, for example, in a scenario of multicast 1, if an intra-group user terminal can correctly decode a PSCCH corresponding to a PSSCH, but fails to decode the PSSCH, the terminal feeds back a PSFCH sequence that carries NACK information; otherwise, the terminal feeds back no information. It can be learned from Table 2 that, in the scenario of multicast 1, only a PSFCH sequence for which $m_{cs}=0$ on the first PRB is occupied for NACK transmission. In other words, for the phase of the second sequence, $m_{cs}=0$. In this case, a PSFCH sequence that is on the first PRB and that is phase-offset by $m_{cs}=6$ relative to the second sequence may be used as the third sequence.

In another possible implementation, when a plurality of PSFCH sequence pairs can be multiplexed on a PRB in the first feedback resource set configured in the resource pool, that is, $$N_{CS}^{PSFCH} \geq 2,$$

and the third terminal uses only the first sequence and the second sequence on the first PRB, a PSFCH sequence other than the first sequence and the second sequence on the first PRB may be used as the third sequence. For example, the phase of the third sequence is offset by the first reference value relative to the phase of the first sequence or the phase of the second sequence. Specifically, the third sequence has different $m_0$ from the first sequence and the second sequence, and the third sequence has same $m_{cs}$ as the first sequence or the second sequence. In other words, for the third sequence, $$m_0' = (m_0 + P)$$

mod 6, where P represents the first reference value and is a positive integer, and may be 1, 2, 3, 4, or 5. Alternatively, the third sequence has same $m_0$ as the first sequence and the second sequence, and the third sequence has different $m_{cs}$ from the first sequence or the second sequence. In other words, for the third sequence, $m'_{cs}=(m_{cs}+Q)$mod 6, where Q represents the first reference value and is a positive integer, and may be 1, 2, 3, 4, or 5.

Manner 2: The third terminal sends the third sequence on a second PRB in the first feedback resource set, where the second PRB and the first PRB are adjacent in the first feedback resource set, and the phase of the third sequence is the same as the phase of the first sequence or the phase of the second sequence.

During specific implementation, the third sequence is sent on a second PRB adjacent to the first PRB in the first feedback resource set. It should be noted that, that the first PRB and the second PRB are adjacent means that the first PRB and the second PRB are logically adjacent in the first feedback resource set. For example, in the unicast scenario, assuming that an index of the first PRB is x, an index of the second PRB is $$x1 =$$

$$(x+1)\mathrm{mod}\left(N_{type}^{PSFCH} * M_{subch,slot}^{PSFCH}\right) \text{ or } x2 = (x-1)\mathrm{mod}\left(N_{type}^{PSFCH} * M_{subch,slot}^{PSFCH}\right),$$

where x1 indicates the $1^{st}$ available PRB whose PRB index is greater than x in the first feedback resource set; x2 indicates the $1^{st}$ available PRB whose PRB index is less than x in the first feedback resource set;

$$N_{type}^{PSFCH}$$

indicates that PSFCH resources corresponding to $$N_{type}^{PSFCH}$$

PSSCH sub-channels can be used; and $$M_{subch,slot}^{PSFCH}$$

indicates a quantity of PRBs that may be used as PSFCH resources and that correspond to each PSSCH sub-channel.

It should be noted that, if x is an index with a smallest PRB index value in the first feedback resource set, x2 is circularly upward, and is actually an index with a largest PRB index value in the first feedback resource set; or if x is an index with a largest PRB index value in the first feedback resource set, x1 is circularly downward, and is actually an index with a smallest PRB index value in the first feedback resource set. For example, when the first resource set includes four PRB resources whose logical numbers are 0, 1, 2, and 3 respectively, if x=1, x1=2, and x2=0; if x=0, x1=1, and x2=3; or if x=3, x1=0, and x2=2.

In other words, that the first PRB and the second PRB are adjacent in the first feedback resource set means that the first PRB and the second PRB are logically adjacent in the first feedback resource set. For example, as shown in FIG. 10, when $$N_{PSSCH}^{PSFCH} = 4, \text{ and } M_{PRB,slot}^{PSFCH} = 1,$$

if the control information sent by the first terminal indicates that the first resource occupies the PSSCH sub-channels numbered 5 and 9 in the figure, the first feedback resource set includes the PRBs numbered 5 and 9 in the PSFCH resources. In this case, when the first PRB is the PRB numbered 5, the second PRB is the PRB numbered 9.

The phase of the third sequence may be the same as the phase of the first sequence or the phase of the second sequence. For example, a value of $m_0$ and a value of $m_{cs}$ of the third sequence are the same as a value of $m_0$ and a value of $m_{cs}$ of the first sequence or the second sequence.

Manner 3: The third terminal sends the third sequence on a third PRB in the second feedback resource set, where an index of the third sequence meets:

$$(P_{ID} + M_{ID})\mathrm{mod}\ R_{PRB,CS}^{PSFCH}, P_{ID}$$

is a physical layer source address identifier carried in the first control information, $M_{ID}$ is an identifier used by the third terminal to receive the first data, and $$R_{PRB,CS}^{PSFCH}$$

is a quantity of PSFCH sequences that can be transmitted on the third PRB in the second feedback resource set.

In a possible scenario, the third terminal may not be a target receiving terminal of the first terminal. For example, the first terminal sends sidelink information to a terminal other than the third terminal. In this case, the third terminal is not a target receiving terminal of the first terminal. For example, the third terminal may be a roadside unit, and a function of the third terminal may be sending the first indication information to the first terminal, to indicate whether the second resource reserved by the first terminal conflicts with the third resource reserved by the second terminal or indicate whether the first terminal needs to perform resource reselection on the second resource.

In this scenario, the third terminal sends the third sequence on a feedback resource in the second feedback resource set, where an index of the third sequence meets: $(P_{ID})\mathrm{mod}$ $$R_{PRB,CS}^{PSFCH}, P_{ID}$$

is a physical layer source address identifier carried in the first control information, and $$R_{PRB,CS}^{PSFCH}$$

is a quantity of sequences that can be transmitted on the feedback resource in the second feedback resource set. The second feedback resource set includes a feedback resource corresponding to a bit whose bit value is 0 in a bitmap corresponding to a resource occupied by a physical sidelink feedback control channel PSFCH.

It may be understood that $M_{ID}$ is an identifier used by the third terminal to receive the first data. When the third terminal is not a target receiving terminal of the first terminal, there is no identifier for receiving the first data. In this case, the following may be defined: $M_{ID}=0$, and the index of the third sequence meets:

$$(P_{ID})\mathrm{mod}\ R_{PRB,CS}^{PSFCH}.$$

In addition, the third terminal sends the third sequence on a feedback resource in the second feedback resource set, where the third sequence may be the $1^{st}$ sequence carried on the $1^{st}$ feedback resource in the second feedback resource set.

Specifically, when the third terminal assists the first terminal or the second terminal in performing resource reselection, the first terminal and the second terminal may correspond to different $P_{ID}$, and the third terminal needs to separately calculate an index of the third sequence sent when the third terminal assists the first terminal in performing resource reselection and an index of the third sequence sent when the third terminal assists the second terminal in performing resource reselection. To reduce calculation complexity of the third terminal or reduce parameters stored by the third terminal, it may be further defined in this embodiment of this application that $P_{ID}=0$. In this case, when $M_{ID}=0$ and $P_{ID}=0$, the third sequence is the $1^{st}$ sequence carried on the $1^{st}$ feedback resource in the second feedback resource set. In other words, the third terminal sends the first indication information on the $1^{st}$ sequence in the second feedback resource set. It may alternatively be understood as that the third terminal sends the third sequence on the $1^{st}$ PRB in the second feedback resource set, where a cyclic shift corresponding to the third sequence is $m_{CS}=0$.

It may be understood that, in Manner 3, the $$R_{PRB,CS}^{PSFCH}$$

PSFCH sequences are arranged and encoded in ascending order in which frequency domain is followed by code domain. Therefore, after the index of the third sequence is determined, an index of the third PRB in which the third sequence is located in the second feedback resource set may be determined, so that a location of the third PRB and the phase of the third sequence are determined. For specific implementation, refer to Formula 5 to Formula 7. Details are not described herein again.

S1104: The first terminal performs resource reselection on the second resource.

During specific implementation, the first terminal may perform listening again in the resource pool, and reselect the second resource.

Figure 12:
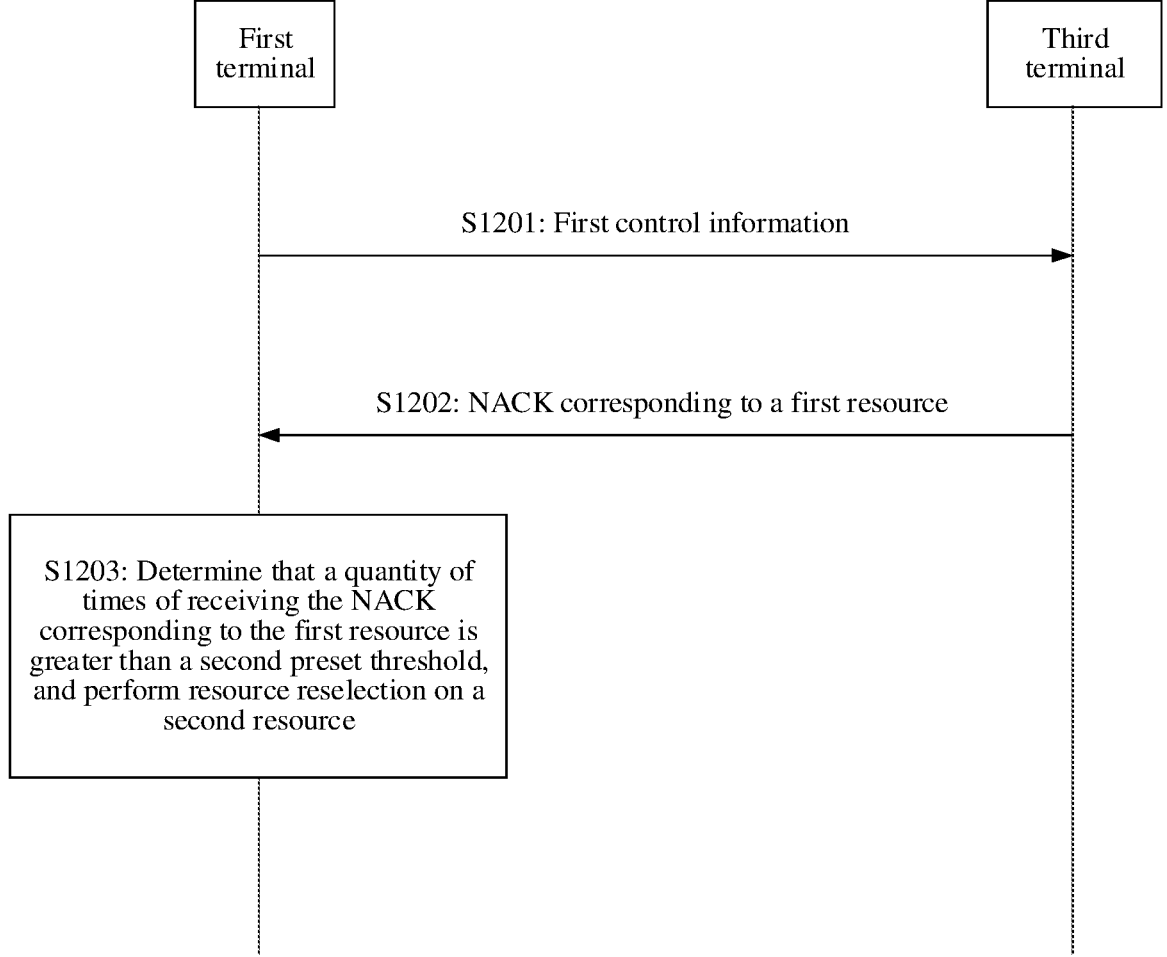
FIG. 12 is a flowchart of a resource reselection method according to an embodiment of this application.

An embodiment of this application further provides a resource re-evaluation method. The method may be performed by a terminal, or may be performed by a combined device or component having a function of the terminal, or may be performed by a communications chip (for example, a processor, a baseband chip, or a chip system) applied to the terminal. An example in which the method is performed by a terminal is used. As shown in FIG. 12, the method includes the following steps.

S1201: A first terminal sends first control information to a third terminal.

The first control information indicates a first resource and a second resource, the first resource carries first data corresponding to the first control information, and the second resource is a sending resource reserved by the first terminal.

S1202: The third terminal sends a NACK corresponding to the first resource to the first terminal.

S1203: The first terminal determines that a quantity of times of receiving the NACK corresponding to the first resource is greater than a second preset threshold, and performs resource reselection on the second resource.

The resource reselection method provided in this application is further described below by using several specific embodiments.

Figure 13:
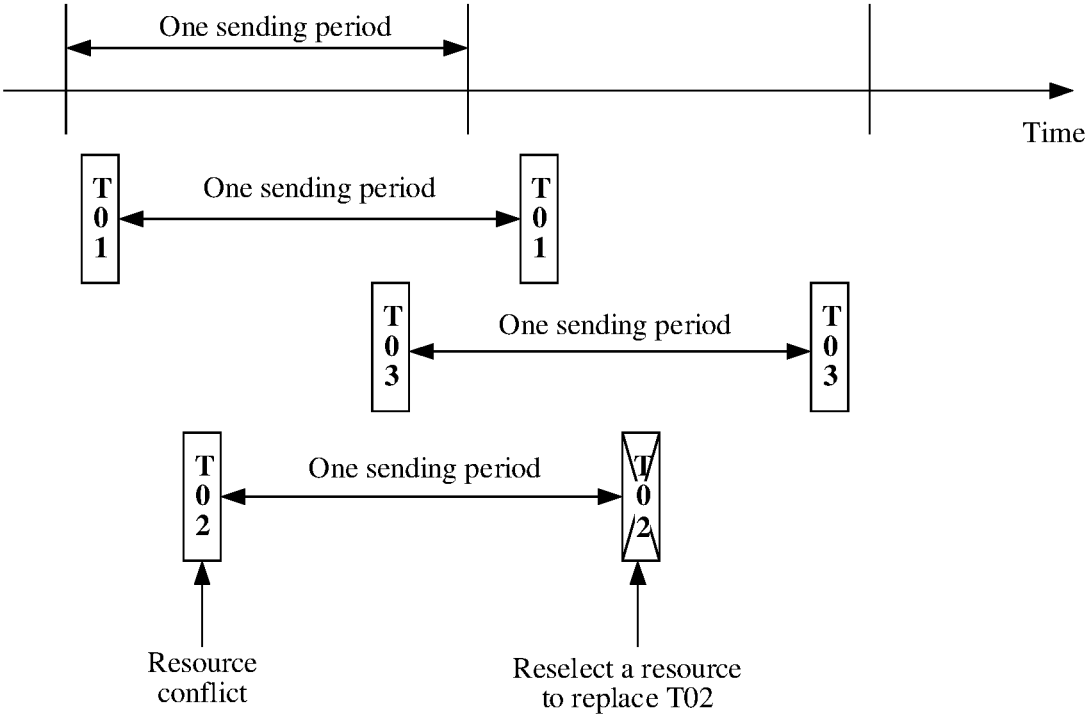
FIG. 13 is a schematic diagram in which a terminal reserves a PSSCH resource for a plurality of times in a sending period according to an embodiment of this application.

In some embodiments, the first terminal reserves a PSSCH resource for a plurality of times in one sending period to send data to the third terminal. For example, as shown in FIG. 13, the first terminal reserves a PSSCH resource for three times in one sending period: T01, T02, and T03, where T01 is used for initial transmission, and T02 and T03 are used for retransmission of same data. The second preset threshold P is designed. If a quantity of times for which the first terminal receives NACK feedback information corresponding to T02 is greater than P, the first terminal stops using a T02 transmission resource in a next sending period, performs resource reselection, and selects an available resource from a resource pool to replace the T02 transmission resource.

It should be noted that the second preset threshold may be configured in the resource pool and delivered by the resource pool to a terminal, or may be a correspondence, that is configured in the resource pool, between a service priority and a threshold, and the third terminal determines, by querying the correspondence between a service priority and a threshold, a threshold corresponding to a service priority of the third terminal.

In some embodiments, for example, in a unicast scenario and a scenario of multicast 2, the first terminal sends control information to the third terminal, where the control information indicates a first resource and a second resource, the first resource carries first data corresponding to the control information, and the second resource is a sending resource reserved by the first terminal.

The third terminal determines that the second resource meets a resource reselection condition, and sends first indication information to the first terminal, where the first indication information is a first sequence and a second sequence, the first sequence is used to carry an acknowledgment ACK corresponding to the first resource, and the second sequence is used to carry a negative acknowledgment NACK corresponding to the first resource.

Specifically, the first sequence is sent on a first PRB in a first feedback resource set, and the second sequence is simultaneously sent on the PRB.

After simultaneously receiving the ACK and the NACK corresponding to the first resource, the first terminal determines that a resource conflict exists in the second resource, and performs resource reselection on the second resource.

In some embodiments, for example, in a scenario of multicast 1, the first terminal sends control information to the third terminal, where the control information indicates a first resource and a second resource, the first resource carries first data corresponding to the control information, and the second resource is a sending resource reserved by the first terminal.

It is known that, when the third terminal correctly decodes a PSCCH, but fails to decode a PSSCH corresponding to the PSCCH, the third terminal feeds back, to the first terminal, a second sequence used for NACK transmission. It is assumed that the second sequence is located on the first PRB, and $m_{cs}=0$.

The third terminal determines that the second resource meets a resource reselection condition, and sends first indication information to the first terminal, where the first indication information is a third sequence. During specific implementation, the first indication information is fed back to the first terminal by using the third sequence on the first PRB in the first feedback resource set. A phase of the third sequence is offset by a first reference value relative to a phase of the second sequence. Specifically, for the third sequence, $m_{cs}$=6.

After receiving the first indication information sent by the third terminal, the first terminal determines that a resource conflict exists in the second resource, and performs resource reselection on the second resource.

In some embodiments, for example, in a unicast scenario, when a quantity of PSFCH sequences that can be multiplexed on a PRB in the first feedback resource set configured in the resource pool is $$N_{CS}^{PSFCH} \geq 2,$$

it indicates that a quantity of PSFCH sequence pairs that can be multiplexed on one PRB in the first feedback resource set is greater than or equal to 2.

The first terminal sends control information to the third terminal, where the control information indicates a first resource and a second resource, the first resource carries first data corresponding to the control information, and the second resource is a sending resource reserved by the first terminal.

It is known that, when correctly decoding a PSSCH sent by the first terminal, the third terminal feeds back, to the first terminal, a first sequence used for ACK transmission; otherwise, the third terminal feeds back, to the first terminal, a second sequence used for NACK transmission. The first sequence and the second sequence are a PSFCH sequence pair on a first PRB in the first feedback resource set. In addition, for the first sequence, $m_{cs}$=0, and for the second sequence, $m_{cs}$=6.

The third terminal determines that the second resource meets a reselection condition, and sends first indication information to the first terminal, where the first indication information is a third sequence. During specific implementation, the third sequence is sent on the first PRB in the first feedback resource set, and the third sequence is different from the first sequence and the second sequence. Further, the third sequence may be a PSFCH sequence other than the first sequence and the second sequence in the PSFCH sequences multiplexed on the first PRB. For example, the phase of the third sequence is offset by the first reference value relative to the phase of the first sequence or the phase of the second sequence. Specifically, $$m_0'$$

of the third sequence is different from $m_0$ of the first sequence and the second sequence, and the third sequence has same $m_{cs}$ as the first sequence or the second sequence. In other words, for the third sequence, $$m_0' = (m_0 + P) \bmod 6,$$

where P represents the first reference value and is a positive integer, and may be 1, 2, 3, 4, or 5. Alternatively, the third sequence has same $m_0$ as the first sequence and the second sequence, and $m'_{cs}$ of the third sequence is different from $m_{cs}$ of the first sequence or the second sequence. In other words, for the third sequence, $$m_{cs}' = (m_{cs} + Q) \bmod 6,$$

where Q represents the first reference value and is a positive integer, and may be 1, 2, 3, 4, or 5.

For example, when $$N_{CS}^{PSFCH} = 2,$$

for the third sequence, $$m_0' = (m_0 + 3) \bmod 6,$$

and $m_{cs}$=0 or $m_{cs}$=6.

When $$N_{CS}^{PSFCH} = 3,$$

for the third sequence, $$m_0' = (m_0 + 4) \bmod 6,$$

and $m_{cs}$=0 or $m_{cs}$=6.

When $$N_{CS}^{PSFCH} = 6,$$

for the third sequence, $$m_0' = (m_0 + 3) \bmod 6,$$

and $m_{cs}$=0 or $m_{cs}$=6.

Alternatively, when $$N_{CS}^{PSFCH} = 2,$$

for the third sequence, $$m_0' = m_0, \text{ and } m_{cs}' = (m_{cs} + 3) \bmod 6.$$

When $$N_{CS}^{PSFCH} = 3,$$

for the third sequence, $$m'_0 = m_0, \text{ and } m'_{cs} = (m_{cs} + 5) \bmod 6.$$

When $$N^{PSFCH}_{CS} = 6,$$

for the third sequence, $$m'_0 = m_0, \text{ and } m'_{cs} = (m_{cs} + 2) \bmod 6.$$

After receiving the first indication information sent by the third terminal, the first terminal determines that a resource conflict exists in the second resource, and performs resource reselection on the second resource.

In some embodiments, for example, in a unicast scenario, if a quantity of PRBs that are allocated by the resource pool to each PSSCH sub-channel and that are used for PSFCH feedback is $$M^{PSFCH}_{subch,slot} \geq 2,$$

it indicates that the first feedback resource set includes at least two PRBs.

The first terminal sends control information to the third terminal, where the control information indicates a first resource and a second resource, the first resource carries first data corresponding to the control information, and the second resource is a sending resource reserved by the first terminal.

It is known that, when correctly decoding a PSSCH sent by the first terminal, the third terminal feeds back, to the first terminal, a first sequence used for ACK transmission; otherwise, the third terminal feeds back, to the first terminal, a second sequence used for NACK transmission. The first sequence and the second sequence are a PSFCH sequence pair on a first PRB in the first feedback resource set. In addition, for the first sequence, $m_{cs}=0$, and for the second sequence, $m_{cs}=6$.

$$x = \left((P_{ID} + M_{ID})\bmod R^{PSFCH}_{PRB,CS}\right)\bmod\left(R^{PSFCH}_{PRB,CS} \big/ \left(N^{PSFCH}_{CS} * N^{PSFCH}_{type}\right)\right)$$

The third terminal determines that the second resource meets a reselection condition, and sends first indication information to the first terminal, where the first indication information is a third sequence. During specific implementation, the third sequence is sent on a second PRB adjacent to the first PRB in the first feedback resource set. According to the foregoing content, it is assumed that an index of the first PRB is:

$$x = \left((P_{ID} + M_{ID})\bmod R^{PSFCH}_{PRB,CS}\right)\bmod\left(R^{PSFCH}_{PRB,CS} \big/ \left(N^{PSFCH}_{CS} * N^{PSFCH}_{type}\right)\right)$$

In this case, an index of the second PRB is:

$$x1 = (x + 1)\bmod\left(N^{PSFCH}_{type} * M^{PSFCH}_{subch,slot}\right) \text{ or } x2 = (x - 1)\bmod\left(N^{PSFCH}_{type} * M^{PSFCH}_{subch,slot}\right).$$

$$m'_0 m_0 m'_0 \lfloor (P_{ID} + M_{ID})\bmod R^{PSFCH}_{PRB,CS} \big/ \left(R^{PSFCH}_{PRB,CS} \big/ \left(R^{PSFCH}_{PRB,CS} \big/ \left(N^{PSFCH}_{CS} * N^{PSFCH}_{type}\right)\right)\right) \rfloor$$

The phase the third sequence may be the same as the phase of the first sequence or the phase of the second sequence. For example, a value of the third sequence is the same as a value of the first sequence or the first sequence, and may be determined according to the following formula:

$$m'_0 m_0 m'_0 \lfloor (P_{ID} + M_{ID})\bmod R^{PSFCH}_{PRB,CS} \big/ \left(R^{PSFCH}_{PRB,CS} \big/ \left(R^{PSFCH}_{PRB,CS} \big/ \left(N^{PSFCH}_{CS} * N^{PSFCH}_{type}\right)\right)\right) \rfloor$$

A value of $m_{cs}$ of the third sequence is the same as a value of $m_{cs}$ of the first sequence or the second sequence. For example, for the third sequence, $m_{cs}=0$ or $m_{cs}=6$.

Herein, $P_{ID}$ represents a physical layer source address identifier carried in the control information, $M_{ID}$ is an identifier used by the third terminal to receive the first data, $$R^{PSFCH}_{PRB,CS}$$

is a quantity of PSFCH sequences that can be transmitted on a PRB in the first feedback resource set, $$N^{PSFCH}_{CS}$$

represents a quantity of PSFCH sequence pairs that can be multiplexed on a PSFCH resource of one PRB configured in the resource pool, and $$N^{PSFCH}_{type}$$

indicates that PSFCH resources corresponding to $$N^{PSFCH}_{type}$$

sub-channels can be used.

After receiving the first indication information sent by the third terminal, the first terminal determines that a resource conflict exists in the second resource, and performs resource reselection on the second resource.

In some embodiments, the first terminal sends control information to the third terminal, where the control information indicates a first resource and a second resource, the first resource carries first data corresponding to the control information, and the second resource is a sending resource reserved by the first terminal.

The third terminal determines that the second resource meets a reselection condition, and sends first indication information to the first terminal, where the first indication information is a third sequence. During specific implementation, the third sequence is sent on a PRB in a second feedback resource set.

$$(P_{ID} + M_{ID}) \bmod R_{PRB,CS}^{PSFCH}$$

an optional implementation, an index of the third sequence meets:

$$(P_{ID} + M_{ID}) \bmod R_{PRB,CS}^{PSFCH}$$

$$\left((P_{ID} + M_{ID}) \bmod R_{PRB,CS}^{PSFCH}\right) \bmod \left(R_{PRB,CS}^{PSFCH} / \left(N_{CS}^{PSFCH} * N_{type}^{PSFCH}\right)\right)$$

In this case, an index of the PRB in the second feedback resource set meets:

$$\left((P_{ID} + M_{ID}) \bmod R_{PRB,CS}^{PSFCH}\right) \bmod \left(R_{PRB,CS}^{PSFCH} / \left(N_{CS}^{PSFCH} * N_{type}^{PSFCH}\right)\right)$$

$$m_0' \lfloor (P_{ID} +$$

$$M_{ID}) \bmod R_{PRBCS}^{PSFCH} / \left(R_{PRBCS}^{PSFCH} / \left(R_{PRBCS}^{PSFCH} / \left(N_{CS}^{PSFCH} * N_{type}^{PSFCH}\right)\right)\right)\rfloor$$

Further, for the third sequence, may be determined according to the following formula:

$$m_0' \lfloor (P_{ID} +$$

$$M_{ID}) \bmod R_{PRBCS}^{PSFCH} / \left(R_{PRBCS}^{PSFCH} / \left(R_{PRBCS}^{PSFCH} / \left(N_{CS}^{PSFCH} * N_{type}^{PSFCH}\right)\right)\right)\rfloor$$

A value of $m_{cs}$ of the third sequence is the same as a value of $m_{cs}$ of the first sequence or the second sequence. For example, for the third sequence, $m_{cs}$=0 or $m_{cs}$=6.

Herein, $P_{ID}$ represents a physical layer source address identifier carried in the first control information, $M_{ID}$ is an identifier used by the third terminal to receive the first data, $$R_{PRB,CS}^{PSFCH}$$

is a quantity of sequences that can be transmitted on a sub-resource in the second feedback resource set, $$N_{CS}^{PSFCH}$$

represents a quantity of PSFCH sequence pairs that can be multiplexed on a PSFCH resource of one PRB configured in the resource pool, and $$N_{type}^{PSFCH}$$

indicates that PSFCH resources corresponding to $$N_{type}^{PSFCH}$$

sub-channels can be used.

After receiving the first indication information sent by the third terminal, the first terminal determines that a resource conflict exists in the second resource, and performs resource reselection on the second resource.

It should be noted that, in the scenario of multicast 2, each intra-group terminal feeds back an ACK and a NACK by using different PSFCH sequence pairs. When a quantity of bits whose bit values are 0 in a bitmap of a PSFCH frequency domain resource configured in the resource pool is greater than or equal to a quantity of bits whose bit values are 1, implementation may be performed according to the manner provided in this embodiment.

Alternatively, when the quantity of bits whose bit values are 0 in the bitmap of the PSFCH frequency domain resource configured in the resource pool is greater than or equal to $$N_{subch} * N_{PSSCH}^{PSFCH},$$

that is, when it can be ensured that each PSSCH sub-channel has a corresponding PRB for sending the third sequence, implementation may be performed according to the manner provided in this embodiment.

Figure 14:
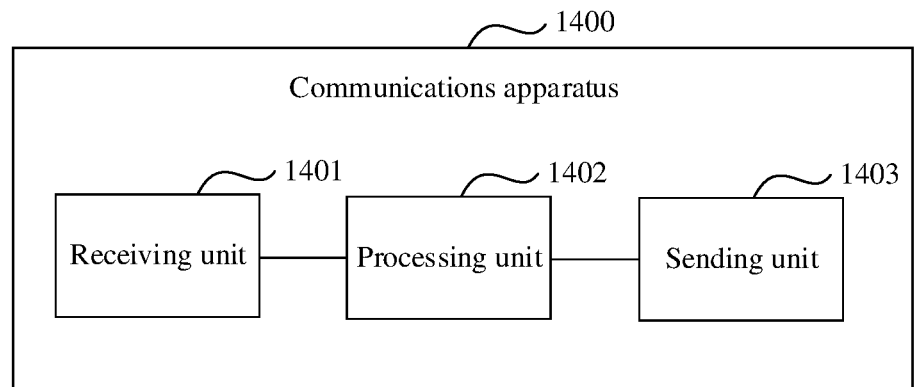
FIG. 14 is a schematic diagram of a structure of a communications apparatus 1400 according to an embodiment of this application.

Based on a same technical concept, this application further provides a communications apparatus 1400. The communications apparatus 1400 may be a terminal, or may be a device or component having a function of the terminal, or may be a chip (for example, a baseband chip) applied to the terminal. The functions or modules may be implemented by software or hardware, or may be implemented by hardware executing corresponding software, or may be implemented by a combination of software and hardware. Alternatively, the communications apparatus may be another communications module, configured to implement the method in the method embodiment of this application. A structure of the communications apparatus 1400 is shown in FIG. 14, including a receiving unit 1401, a processing unit 1402, and a sending unit 1403. In an example, the sending unit 1403 may be a transmitter, and the receiving unit 1401 may be a receiver. The transmitter may include an antenna, a radio frequency circuit, and the like, and the receiver may also include an antenna, a radio frequency circuit, and the like. The transmitter and the receiver may belong to one function module, for example, may be referred to as a transceiver. Alternatively, the transmitter and the receiver may be function modules independent of each other. The processing unit 1402 may be a processor, for example, a baseband processor, and the baseband processor may include one or more central processing units (central processing unit, CPU). In another example, the sending unit 1403 and the receiving unit 1401 may be radio frequency units, and the processing unit 1402 may be a processor, for example, a baseband processor. In still another example, the sending unit 1403 and the receiving unit 1401 may be input/output interfaces of a chip (for example, a baseband chip) (for example, the sending unit 1403 is an output interface, and the receiving unit 1401 is an input interface, or if an input interface and an output interface are a same interface, the sending unit 1403 and the receiving unit 1401 each are the interface); and the processing unit 1402 may be a processor of the chip system, and may include one or more central processing units. It should be understood that, in this embodiment of this application, the processing unit 1402 may be implemented by a processor or a processor-related circuit component, the sending unit 1403 may be implemented by a transmitter or a transmitter-related circuit component, and the receiving unit 1401 may be implemented by a receiver or a receiver-related circuit component.

The communications apparatus 1400 may be applied to the third terminal shown in FIG. 11, and may implement the resource reselection assistance method provided in the foregoing embodiment. The following describes functions of the units of the communications apparatus 1400.

The receiving unit 1401 is configured to receive control information from a first terminal, where the control information indicates a first resource and a second resource, the first resource carries first data corresponding to the control information, and the second resource is a sending resource reserved by the first terminal.

The processing unit 1402 is configured to determine that the second resource meets a reselection condition.

The sending unit 1403 is configured to send indication information to the first terminal, where the indication information indicates to reselect the second resource.

In an implementation, the control information includes resource reselection trigger information, and the resource reselection trigger information is used to trigger resource reselection assistance; and/or the receiving unit is further configured to receive resource reselection enabling information, where the resource reselection enabling information is used to enable the resource reselection assistance.

In an implementation, the processing unit 1402 is specifically configured to determine that the second resource and a third resource overlap, and a priority of the third resource is higher than a priority of the second resource, where the third resource is a sending resource reserved by a second terminal.

In an implementation, the indication information is a first sequence and a second sequence, the first sequence is used to carry an acknowledgment ACK corresponding to the first resource, and the second sequence is used to carry a negative acknowledgment NACK corresponding to the first resource; or the indication information is a third sequence, and the third sequence is different from the first sequence and the second sequence.

In an implementation, the indication information is the first sequence and the second sequence, and the sending unit 1403 is specifically configured to send the first sequence and the second sequence on a feedback resource in a first feedback resource set, where the first feedback resource set includes a feedback resource corresponding to the first resource in a resource occupied by a physical sidelink feedback control channel PSFCH.

In an implementation, the indication information is the third sequence, and the sending unit 1403 is specifically configured to: send the third sequence on a first feedback resource in a first feedback resource set, where the first feedback resource and a feedback resource that is used to carry the first sequence or the second sequence overlap in frequency domain, and a phase of the third sequence is offset by a first reference value relative to a phase of the first sequence or a phase of the second sequence; or send the third sequence on a second feedback resource in the first feedback resource set, where the second feedback resource and the feedback resource that is used to carry the first sequence or the second sequence are adjacent in the first feedback resource set, and the phase of the third sequence is the same as the phase of the first sequence or the phase of the second sequence. The first feedback resource set includes a feedback resource corresponding to the first resource in a resource occupied by a physical sidelink feedback control channel PSFCH.

In an implementation, the indication information is the third sequence, and the sending unit 1403 is specifically configured to: send the third sequence on a feedback resource in a second feedback resource set, where an index of the third sequence meets:

$$(P_{ID} + M_{ID}) \bmod R_{PRB,CS}^{PSFCH}, P_{ID}$$

is a physical layer source address identifier carried in the control information, $M_{ID}$ is an identifier used to receive the first data, and $$R_{PRB,CS}^{PSFCH}$$

is a quantity of sequences that can be transmitted on the feedback resource in the second feedback resource set. The second feedback resource set includes a feedback resource corresponding to a bit whose bit value is 0 in a bitmap corresponding to a resource occupied by a physical sidelink feedback control channel PSFCH.

In an implementation, the indication information is the third sequence, and the sending unit 1403 is specifically configured to: send the third sequence on a feedback resource in a second feedback resource set, where an index of the third sequence meets:

$$(P_{ID}) \bmod R_{PRB,CS}^{PSFCH}, P_{ID}$$

is a physical layer source address identifier carried in the control information, and $$R_{PRB,CS}^{PSFCH}$$

is a quantity of sequences that can be transmitted on the feedback resource in the second feedback resource set. The second feedback resource set includes a feedback resource corresponding to a bit whose bit value is 0 in a bitmap corresponding to a resource occupied by a physical sidelink feedback control channel PSFCH.

In an implementation, the indication information is the third sequence, and the sending unit 1403 is specifically configured to send the third sequence on a feedback resource in a second feedback resource set, where the third sequence is the $1^{st}$ sequence carried on the $1^{st}$ feedback resource in the second feedback resource set. The second feedback resource set includes a feedback resource corresponding to a bit whose bit value is 0 in a bitmap corresponding to a resource occupied by a physical sidelink feedback control channel PSFCH.

Figure 15:
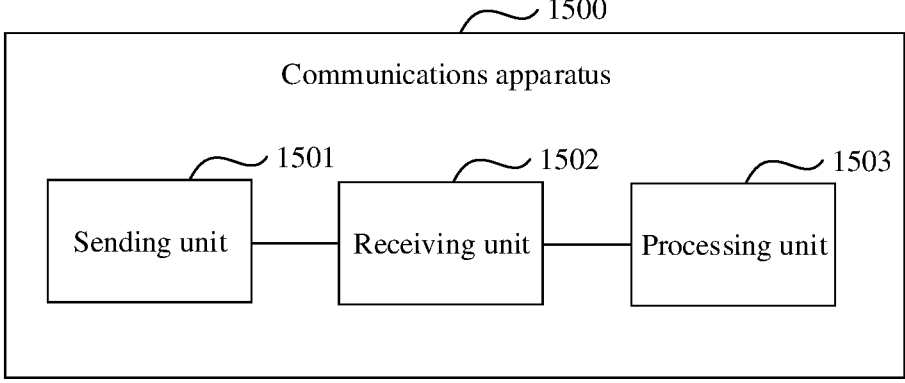
FIG. 15 is a schematic diagram of a structure of a communications apparatus 1500 according to an embodiment of this application.

Based on a same technical concept, this application further provides a communications apparatus 1500. The communications apparatus 1500 may be a terminal, or may be a device or component having a function of the terminal, or may be a chip (for example, a baseband chip) applied to the terminal. The functions or modules may be implemented by software or hardware, or may be implemented by hardware executing corresponding software, or may be implemented by a combination of software and hardware. Alternatively, the communications apparatus may be another communications module, configured to implement the method in the method embodiment of this application. A structure of the communications apparatus 1500 is shown in FIG. 15, including a sending unit 1501, a receiving unit 1502, and a processing unit 1503. In an example, the sending unit 1501 may be a transmitter, and the receiving unit 1502 may be a receiver. The transmitter may include an antenna, a radio frequency circuit, and the like, and the receiver may also include an antenna, a radio frequency circuit, and the like. The transmitter and the receiver may belong to one function module, for example, may be referred to as a transceiver. Alternatively, the transmitter and the receiver may be function modules independent of each other. The processing unit 1503 may be a processor, for example, a baseband processor, and the baseband processor may include one or more central processing units (central processing unit, CPU). In another example, the sending unit 1501 and the receiving unit 1502 may be radio frequency units, and the processing unit 1503 may be a processor, for example, a baseband processor. In still another example, the sending unit 1501 and the receiving unit 1502 may be input/output interfaces of a chip (for example, a baseband chip) (for example, the sending unit 1501 is an output interface, and the receiving unit 1502 is an input interface, or if an input interface and an output interface are a same interface, the sending unit 1501 and the receiving unit 1502 each are the interface); and the processing unit 1503 may be a processor of the chip system, and may include one or more central processing units. It should be understood that, in this embodiment of this application, the processing unit 1503 may be implemented by a processor or a processor-related circuit component, the sending unit 1501 may be implemented by a transmitter or a transmitter-related circuit component, and the receiving unit 1502 may be implemented by a receiver or a receiver-related circuit component.

The communications apparatus 1500 may be applied to the first terminal shown in FIG. 11, and may implement the resource reselection method provided in the foregoing embodiment. The following describes functions of the units of the communications apparatus 1500.

The sending unit 1501 is configured to send control information to a third terminal, where the control information indicates a first resource and a second resource, the first resource carries first data corresponding to the control information, and the second resource is a sending resource reserved by the first terminal.

The receiving unit 1502 is configured to receive first indication information sent by the third terminal.

The processing unit 1503 is configured to perform resource reselection on the second resource.

In an implementation, the control information further includes resource reselection trigger information, and the resource reselection trigger information is used to trigger the third terminal to perform resource reselection assistance.

In an implementation, the receiving unit is specifically configured to: receive a first sequence and a second sequence that are sent by the third terminal, where the first sequence is used to transmit an acknowledgment ACK corresponding to the first resource, and the second sequence is used to transmit a negative acknowledgment NACK corresponding to the first resource; or receive a third sequence sent by the third terminal, where the third sequence is different from the first sequence and the second sequence.

Figure 16:
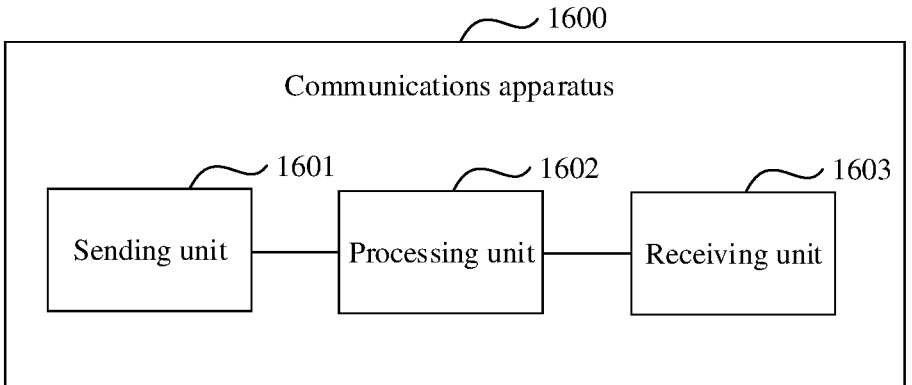
FIG. 16 is a schematic diagram of a structure of a communications apparatus 1600 according to an embodiment of this application.

Based on a same technical concept, this application further provides a communications apparatus 1600. The communications apparatus 1600 may be a terminal, or may be a device or component having a function of the terminal, or may be a chip (for example, a baseband chip) applied to the terminal. The functions or modules may be implemented by software or hardware, or may be implemented by hardware executing corresponding software, or may be implemented by a combination of software and hardware. Alternatively, the communications apparatus may be another communications module, configured to implement the method in the method embodiment of this application. A structure of the communications apparatus is shown in FIG. 16, including a sending unit 1601, a processing unit 1602, and a receiving unit 1603. In an example, the sending unit 1601 may be a transmitter, and the receiving unit 1603 may be a receiver. The transmitter may include an antenna, a radio frequency circuit, and the like, and the receiver may also include an antenna, a radio frequency circuit, and the like. The transmitter and the receiver may belong to one function module, for example, may be referred to as a transceiver. Alternatively, the transmitter and the receiver may be function modules independent of each other. The processing unit 1602 may be a processor, for example, a baseband processor, and the baseband processor may include one or more central processing units (central processing unit, CPU). In another example, the sending unit 1601 and the receiving unit 1603 may be radio frequency units, and the processing unit 1602 may be a processor, for example, a baseband processor. In still another example, the sending unit 1601 and the receiving unit 1603 may be input/output interfaces of a chip (for example, a baseband chip) (for example, the sending unit 1601 is an output interface, and the receiving unit 1603 is an input interface, or if an input interface and an output interface are a same interface, the sending unit 1601 and the receiving unit 1603 each are the interface); and the processing unit 1602 may be a processor of the chip system, and may include one or more central processing units. It should be understood that, in this embodiment of this application, the processing unit 1602 may be implemented by a processor or a processor-related circuit component, the sending unit 1601 may be implemented by a transmitter or a transmitter-related circuit component, and the receiving unit 1603 may be implemented by a receiver or a receiver-related circuit component.

The communications apparatus 1600 may be applied to the first terminal shown in FIG. 12, and may implement the resource reselection method provided in the foregoing embodiment. The following describes functions of the units of the communications apparatus 1600.

The sending unit 1601 is configured to send control information to a third terminal, where the control information indicates a first resource and a second resource, the first resource carries first data corresponding to the control information, and the second resource is a sending resource reserved by the first terminal.

The processing unit 1602 is configured to: determine that a quantity of times of receiving, by using the receiving unit 1603, a negative acknowledgment NACK corresponding to the first resource is greater than a preset threshold; and perform resource reselection on the second resource.

Figure 17:
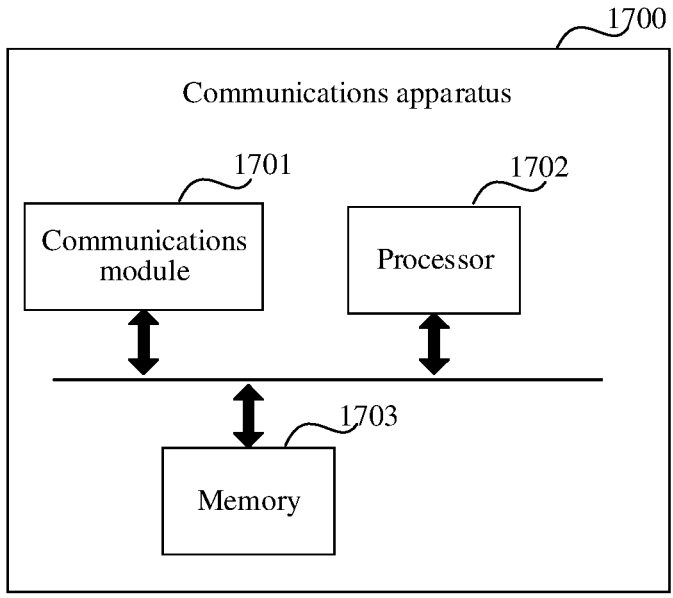
FIG. 17 is a schematic diagram of a structure of a communications apparatus 1700 according to an embodiment of this application.

Based on a same technical concept, this application further provides a communications apparatus 1700. A structure of the communications apparatus is shown in FIG. 17. The communications apparatus 1700 may be applied to the third terminal shown in FIG. 11, and may implement the resource reselection assistance method provided in the foregoing embodiment. As shown in FIG. 17, the communications apparatus 1700 includes a communications module 1701, a processor 1702, and a memory 1703. The communications module 1701, the processor 1702, and the memory 1703 are connected to each other.

Optionally, the communications module 1701, the processor 1702, and the memory 1703 are coupled to each other.

The communications module 1701 is configured to receive and send data, to implement communication and interaction with another device. For example, when the communications apparatus 1700 is applied to the third terminal shown in FIG. 11, the communications module 1701 may be implemented by using a physical interface, a communications module, a communications interface, and an input/output interface.

The processor 1702 is configured to: receive control information from a first terminal by using the communications module 1701, where the control information indicates a first resource and a second resource, the first resource carries first data corresponding to the control information, and the second resource is a sending resource reserved by the first terminal; determine that the second resource meets a reselection condition; and send indication information to the first terminal by using the communications module 1701, where the indication information indicates to reselect the second resource.

In an implementation, the control information includes resource reselection trigger information, and the resource reselection trigger information is used to trigger resource reselection assistance; and/or the processor 1702 is further configured to receive resource reselection enabling information by using the communications module 1701, where the resource reselection enabling information is used to enable the resource reselection assistance.

In an implementation, the processor 1702 is specifically configured to determine that the second resource and a third resource overlap, and a priority of the third resource is higher than a priority of the second resource, where the third resource is a sending resource reserved by a second terminal.

In an implementation, the indication information is a first sequence and a second sequence, the first sequence is used to carry an acknowledgment ACK corresponding to the first resource, and the second sequence is used to carry a negative acknowledgment NACK corresponding to the first resource; or the indication information is a third sequence, and the third sequence is different from the first sequence and the second sequence.

In an implementation, the indication information is the first sequence and the second sequence, and the processor 1702 is specifically configured to send the first sequence and the second sequence on a feedback resource in a first feedback resource set by using the communications module 1701, where the first feedback resource set includes a feedback resource corresponding to the first resource in a resource occupied by a physical sidelink feedback control channel PSFCH.

In an implementation, the indication information is the third sequence, and the processor 1702 is specifically configured to: send the third sequence on a first feedback resource in a first feedback resource set by using the communications module 1701, where the first feedback resource and a feedback resource that is used to carry the first sequence or the second sequence overlap in frequency domain, and a phase of the third sequence is offset by a first reference value relative to a phase of the first sequence or a phase of the second sequence; or send the third sequence on a second feedback resource in the first feedback resource set by using the communications module 1701, where the second feedback resource and the feedback resource that is used to carry the first sequence or the second sequence are adjacent in the first feedback resource set, and the phase of the third sequence is the same as the phase of the first sequence or the phase of the second sequence.

The first feedback resource set includes a feedback resource corresponding to the first resource in a resource occupied by a physical sidelink feedback control channel PSFCH.

In an implementation, the indication information is the third sequence, and the processor 1702 is specifically configured to: send the third sequence on a feedback resource in a second feedback resource set by using the communications module 1701, where an index of the third sequence meets:

$$(P_{ID} + M_{ID}) \mathrm{mod} R_{PRB,CS}^{PSFCH}, P_{ID}$$

is a physical layer source address identifier carried in the control information, $M_{ID}$ is an identifier used to receive the first data, and $$R_{PRB,CS}^{PSFCH}$$

is a quantity of sequences that can be transmitted on the feedback resource in the second feedback resource set. The second feedback resource set includes a feedback resource corresponding to a bit whose bit value is 0 in a bitmap corresponding to a resource occupied by a physical sidelink feedback control channel PSFCH.

In an implementation, the indication information is the third sequence, and the processor 1702 is specifically configured to: send the third sequence on a feedback resource in a second feedback resource set by using the communications module 1701, where an index of the third sequence meets: $(P_{ID}) \mathrm{mod}$ $$R_{PRB,CS}^{PSFCH}, P_{ID}$$

is a physical layer source address identifier carried in the control information, and $$R_{PRB,CS}^{PSFCH}$$

is a quantity of sequences that can be transmitted on the feedback resource in the second feedback resource set. The second feedback resource set includes a feedback resource corresponding to a bit whose bit value is 0 in a bitmap corresponding to a resource occupied by a physical sidelink feedback control channel PSFCH.

In an implementation, the indication information is the third sequence, and the processor 1702 is specifically configured to send the third sequence on a feedback resource in a second feedback resource set by using the communications module 1701, where the third sequence is the $1^{st}$ sequence carried on the $1^{st}$ feedback resource in the second feedback resource set. The second feedback resource set includes a feedback resource corresponding to a bit whose bit value is 0 in a bitmap corresponding to a resource occupied by a physical sidelink feedback control channel PSFCH.

The memory 1703 is configured to store program instructions, data, and the like. Specifically, the program instructions may include program code. The program code includes computer operation instructions. The memory 1703 may include a random access memory (random access memory, RAM), or may include a nonvolatile memory (nonvolatile memory), for example, at least one magnetic disk memory. The processor 1702 executes the program instructions stored in the memory 1703, and uses the data stored in the memory 1703, to implement the foregoing functions, to implement the resource reselection assistance method provided in the foregoing embodiment.

It may be understood that the memory 1703 in FIG. 17 of this application may be a volatile memory or a nonvolatile memory, or may include both a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. By way of example and not limitation, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory of the systems and methods described in this specification includes but is not limited to these memories and any other proper types of memories.

Figure 18:
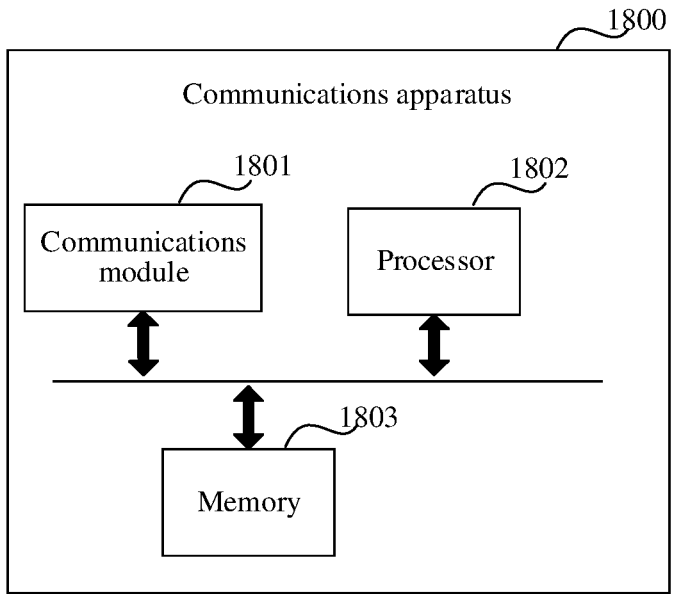
FIG. 18 is a schematic diagram of a structure of a communications apparatus 1800 according to an embodiment of this application.

Based on a same technical concept, this application further provides a communications apparatus 1800. A structure of the communications apparatus is shown in FIG. 18. The communications apparatus 1800 may be applied to the first terminal shown in FIG. 11, and may implement the resource reselection method provided in the foregoing embodiment. As shown in FIG. 18, the communications apparatus 1800 includes a communications module 1801, a processor 1802, and a memory 1803. The communications module 1801, the processor 1802, and the memory 1803 are connected to each other.

Optionally, the communications module 1801, the processor 1802, and the memory 1803 are coupled to each other.

The communications module 1801 is configured to receive and send data, to implement communication and interaction with another device. For example, when the communications apparatus 1800 is applied to the first terminal shown in FIG. 11, the communications module 1801 may be implemented by using a physical interface, a communications module, a communications interface, and an input/output interface.

The processor 1802 is configured to: send control information to a third terminal by using the communications module 1801, where the control information indicates a first resource and a second resource, the first resource carries first data corresponding to the control information, and the second resource is a sending resource reserved by the first terminal; and perform resource reselection on the second resource after receiving, by using the communications module 1801, first indication information sent by the third terminal.

In an implementation, the control information further includes resource reselection trigger information, and the resource reselection trigger information is used to trigger the third terminal to perform resource reselection assistance.

In an implementation, the processor 1802 is specifically configured to: receive, by using the communications module 1801, a first sequence and a second sequence that are sent by the third terminal, where the first sequence is used to transmit an acknowledgment ACK corresponding to the first resource, and the second sequence is used to transmit a negative acknowledgment NACK corresponding to the first resource; or receive, by using the communications module 1801, a third sequence sent by the third terminal, where the third sequence is different from the first sequence and the second sequence.

The memory 1803 is configured to store program instructions, data, and the like. Specifically, the program instructions may include program code. The program code includes computer operation instructions. The memory 1803 may include a random access memory (random access memory, RAM), or may include a nonvolatile memory (nonvolatile memory), for example, at least one magnetic disk memory. The processor 1802 executes the program instructions stored in the memory 1803, and uses the data stored in the memory 1803, to implement the foregoing functions, to implement the resource reselection method provided in the foregoing embodiment.

It may be understood that the memory 1803 in FIG. 18 of this application may be a volatile memory or a nonvolatile memory, or may include both a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. By way of example and not limitation, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory of the systems and methods described in this specification includes but is not limited to these memories and any other proper types of memories.

Figure 19:
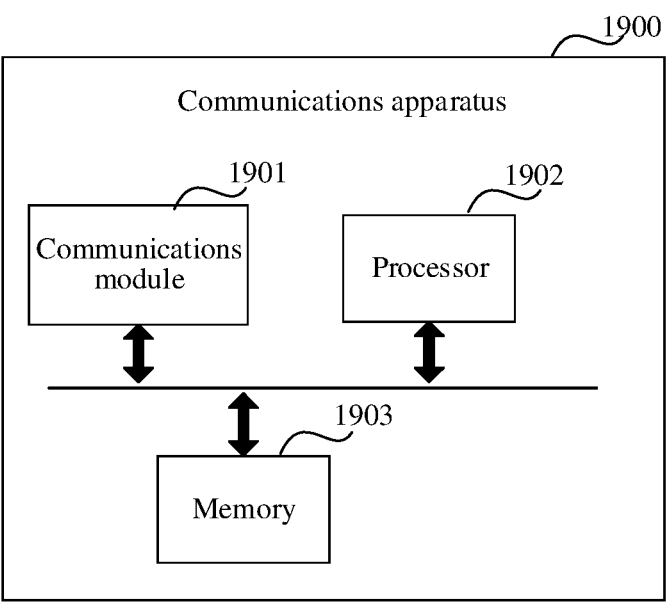
FIG. 19 is a schematic diagram of a structure of a communications apparatus 1900 according to an embodiment of this application.

Based on a same technical concept, this application further provides a communications apparatus 1900. A structure of the communications apparatus is shown in FIG. 19. The communications apparatus 1900 may be applied to the first terminal shown in FIG. 12, and may implement the resource reselection method provided in the foregoing embodiment. As shown in FIG. 19, the communications apparatus 1900 includes a communications module 1901, a processor 1902, and a memory 1903. The communications module 1901, the processor 1902, and the memory 1903 are connected to each other.

Optionally, the communications module 1901, the processor 1902, and the memory 1903 are coupled or connected to each other.

The communications module 1901 is configured to receive and send data, to implement communication and interaction with another device. For example, when the communications apparatus 1900 is applied to the first terminal shown in FIG. 12, the communications module 1901 may be implemented by using a physical interface, a communications module, a communications interface, and an input/output interface.

The processor 1902 is configured to: send control information to a third terminal by using the communications module 1901, where the control information indicates a first resource and a second resource, the first resource carries first data corresponding to the control information, and the second resource is a sending resource reserved by the first terminal; and perform resource reselection on the second resource when determining that a quantity of times of receiving a negative acknowledgment NACK corresponding to the first resource is greater than a preset threshold.

The memory 1903 is configured to store program instructions, data, and the like. Specifically, the program instructions may include program code. The program code includes computer operation instructions. The memory 1903 may include a random access memory (random access memory, RAM), or may include a nonvolatile memory (nonvolatile memory), for example, at least one magnetic disk memory. The processor 1902 executes the program instructions stored in the memory 1903, and uses the data stored in the memory 1903, to implement the foregoing functions, to implement the resource reselection method provided in the foregoing embodiment.

It may be understood that the memory 1903 in FIG. 19 of this application may be a volatile memory or a nonvolatile memory, or may include both a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. By way of example and not limitation, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory of the systems and methods described in this specification includes but is not limited to these memories and any other proper types of memories.

According to the foregoing embodiment, an embodiment of this application further provides a computer program. When the computer program runs on a computer, the computer is enabled to perform the resource reselection assistance method or the resource reselection method provided in the foregoing embodiment.

According to the foregoing embodiment, an embodiment of this application further provides a computer-readable storage medium. The computer-readable storage medium stores a computer program, and when the computer program is executed by a computer, the computer is enabled to perform the resource reselection assistance method or the resource reselection method provided in the foregoing embodiment.

The storage medium may be any available medium that can be accessed by the computer. By way of example and not limitation, the computer-readable medium may include a RAM, a ROM, an EEPROM, a CD-ROM, another optical disc storage or disk storage medium, another magnetic storage device, or any other medium that can carry or store expected program code in a form of instructions or a data structure and can be accessed by a computer.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can indicate the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, and computer-implemented processing is generated.

Therefore, the instructions executed on the computer or the another programmable device provide steps for implementing a specific function in one or more processes in the flowcharts and/or in one or more blocks in the block diagrams.

It is clear that a person skilled in the art can make various modifications and variations to this application without departing from the scope of this application. This application is intended to cover these modifications and variations of this application provided that the modifications and variations fall within the scope of the claims of this application and the equivalent technologies thereof.

What is claimed is:

1. A method, comprising:

receiving control information from a first terminal, wherein the control information indicates a first resource and a second resource, the first resource carries first data corresponding to the control information, and the second resource is a sending resource reserved by the first terminal;

determining that the second resource meets a reselection condition, wherein determining that the second resource meets the reselection condition comprises:

determining that the second resource and a third resource overlap, and a priority of the third resource is higher than a priority of the second resource, and wherein the third resource is a sending resource reserved by a second terminal; and sending indication information to the first terminal, wherein the indication information indicates to reselect the second resource, and wherein the indication information is a third sequence, and the third sequence is sent on a feedback resource in a second feedback resource set, wherein the second feedback resource set is different from a first feedback resource set, a feedback resource in the first feedback resource set is used to send a first sequence and a second sequence, the first sequence is used to carry an acknowledgment (ACK) corresponding to the first resource, and the second sequence is used to carry a negative acknowledgment (NACK) corresponding to the first resource.

2. The method according to claim 1, wherein determining that the second resource meets the reselection condition comprises:

determining that the second resource and the third resource overlap, wherein a reference signal received power (RSRP) measurement value on a fourth resource is greater than an RSRP measurement value on the first resource.

3. The method according to claim 1, wherein the control information further comprises resource reselection trigger information, and the resource reselection trigger information triggers performing resource reselection assistance.

4. The method according to claim 1, further comprising:

receiving resource reselection enabling information, wherein the resource reselection enabling information enables resource reselection assistance.

5. The method according to claim 1, wherein an index of the third sequence meets:

$$(P_{ID} + M_{ID}) \bmod R^{PSFCH}_{PRB,CS},$$

$P_{ID}$ is a physical layer source address identifier carried in the control information, $M_{ID}$ is an identifier of the indication information, and $$R^{PSFCH}_{PRB,CS}$$

is a quantity of sequences that are able to be transmitted on the feedback resource in the second feedback resource set.

6. A method, comprising:

sending control information to a third terminal, wherein the control information indicates a first resource and a second resource, the first resource carries first data corresponding to the control information, and the second resource is a sending resource reserved by a first terminal;

receiving indication information sent by the third terminal, wherein the indication information indicates to reselect the second resource, the indication information being received based on the second resource and a third resource overlapping, and a priority of the third resource being higher than a priority of the second resource, and wherein the third resource is a sending resource reserved by a second terminal; and performing resource reselection on the second resource; and wherein the indication information is a third sequence, and the third sequence is received on a feedback resource in a second feedback resource set, wherein the second feedback resource set is different from a first feedback resource set, a feedback resource in the first feedback resource set is used to send a first sequence and a second sequence, the first sequence is used to carry an acknowledgment (ACK) corresponding to the first resource, and the second sequence is used to carry a negative acknowledgment (NACK) corresponding to the first resource.

7. The method according to claim 6, wherein the control information further comprises resource reselection trigger information, and the resource reselection trigger information triggers the third terminal to perform resource reselection assistance.

8. The method according to claim 6, wherein the indication information being received based on the second resource and the third resource overlapping comprises:

the indication information being received based on the second resource and the third resource overlapping, and wherein a reference signal received power (RSRP) measurement value on a fourth resource is greater than an RSRP measurement value on the first resource.

9. The method according to claim 6, wherein an index of the third sequence meets:

$$(P_{ID} + M_{ID}) \bmod R^{PSFCH}_{PRB,CS},$$

$P_{ID}$ is a physical layer source address identifier carried in the control information, $M_{ID}$ is an identifier of the indication information, and $$R^{PSFCH}_{PRB,CS}$$

is a quantity of sequences that are able to be transmitted on the feedback resource in the second feedback resource set.

10. A communications apparatus, comprising:

one or more processors; and a memory;

wherein the memory stores a computer program, and when executing the computer program stored in the memory, the one or more processors execute operations comprising:

receiving control information from a first terminal, wherein the control information indicates a first resource and a second resource, the first resource carries first data corresponding to the control information, and the second resource is a sending resource reserved by the first terminal;

determining that the second resource meets a reselection condition, wherein determining that the second resource meets the reselection condition comprises:

determining that the second resource and a third resource overlap, and a priority of the third resource is higher than a priority of the second resource, and wherein the third resource is a sending resource reserved by a second terminal; and sending indication information to the first terminal, wherein the indication information indicates to reselect the second resource, and wherein the indication information is a third sequence, and the third sequence is sent on a feedback resource in a second feedback resource set, wherein the second feedback resource set is different from a first feedback resource set, a feedback resource in the first feedback resource set is used to send a first sequence and a second sequence, the first sequence is used to carry an acknowledgment (ACK) corresponding to the first resource, and the second sequence is used to carry a negative acknowledgment (NACK) corresponding to the first resource.

11. The apparatus according to claim 10, wherein:

the control information comprises resource reselection trigger information, and the resource reselection trigger information triggers resource reselection assistance.

12. The apparatus according to claim 10, wherein when executing the computer program stored in the memory, the one or more processors execute operations further comprising:

receiving resource reselection enabling information, wherein the resource reselection enabling information enables resource reselection assistance.

13. The communications apparatus according to claim 10, wherein determining that the second resource meets the reselection condition comprises:

determining that the second resource and the third resource overlap, wherein a reference signal received power (RSRP) measurement value on a fourth resource is greater than an RSRP measurement value on the first resource.

14. The apparatus according to claim 10, wherein an index of the third sequence meets:

$$(P_{ID} + M_{ID}) \bmod R_{PRB,CS}^{PSFCH},$$

$P_{ID}$ is a physical layer source address identifier carried in the control information, $M_{ID}$ is an identifier of the indication information, and $$R_{PRB,CS}^{PSFCH}$$

is a quantity of sequences that are able to be transmitted on the feedback resource in the second feedback resource set.

15. A communications apparatus, comprising:

one or more processors; and a memory, wherein the memory stores a computer program, and when executing the computer program stored in the memory, the one or more processors execute operations comprising:

sending control information to a third terminal, wherein the control information indicates a first resource and a second resource, the first resource carries first data corresponding to the control information, and the second resource is a sending resource reserved by a first terminal;

receiving indication information sent by the third terminal, wherein the indication information indicates to reselect the second resource, the indication information being received based on the second resource and a third resource overlapping, and a priority of the third resource being higher than a priority of the second resource, and wherein the third resource is a sending resource reserved by a second terminal; and performing resource reselection on the second resource; and wherein the indication information is a third sequence, and the third sequence is received on a feedback resource in a second feedback resource set, wherein the second feedback resource set is different from a first feedback resource set, a feedback resource in the first feedback resource set is used to send a first sequence and a second sequence, the first sequence is used to carry an acknowledgment (ACK) corresponding to the first resource, and the second sequence is used to carry a negative acknowledgment (NACK) corresponding to the first resource.

16. The communications apparatus according to claim 15, wherein the control information further comprises resource reselection trigger information, and the resource reselection trigger information triggers the third terminal to perform resource reselection assistance.

17. The communications apparatus according to claim 15, wherein the indication information being received based on the second resource and the third resource overlapping comprises:

the indication information being received based on the second resource and the third resource overlapping, and wherein a reference signal received power (RSRP) measurement value on a fourth resource is greater than an RSRP measurement value on the first resource.

18. The apparatus according to claim 15, wherein an index of the third sequence meets:

$$(P_{ID} + M_{ID}) \bmod R_{PRB,CS}^{PSFCH},$$

$P_{ID}$ is a physical layer source address identifier carried in the control information, $M_{ID}$ is an identifier of the indication information, and $$R_{PRB,CS}^{PSFCH}$$

is a quantity of sequences that are able to be transmitted on the feedback resource in the second feedback resource set.

* * * * *